US008296661B2

(12) United States Patent
Barrie et al.

(10) Patent No.: US 8,296,661 B2
(45) Date of Patent: *Oct. 23, 2012

(54) SYSTEMS AND METHODS FOR FACILITATING ORIGINALITY ANALYSIS

(75) Inventors: John M. Barrie, Berkeley, CA (US); Colin C. Sherman, Berkeley, CA (US)

(73) Assignee: iParadigms, LLC, Oakland, CA (US)

( * ) Notice: Subject to any disclaimer, the term of this patent is extended or adjusted under 35 U.S.C. 154(b) by 511 days.

This patent is subject to a terminal disclaimer.

(21) Appl. No.: 12/558,789

(22) Filed: Sep. 14, 2009

(65) Prior Publication Data

US 2010/0070879 A1 Mar. 18, 2010

Related U.S. Application Data

(63) Continuation of application No. 11/803,605, filed on May 15, 2007, now abandoned, which is a continuation of application No. 10/087,118, filed on Mar. 1, 2002, now Pat. No. 7,219,301.

(51) Int. Cl.
*G06F 3/00* (2006.01)
*G06F 3/01* (2006.01)

(52) U.S. Cl. ........ 715/751; 715/206; 715/234; 715/254; 715/760; 434/322; 434/367

(58) Field of Classification Search .................. 715/206, 715/234, 254, 751, 760
See application file for complete search history.

(56) References Cited

U.S. PATENT DOCUMENTS

| | | | | |
|---|---|---|---|---|
| 5,452,442 | A * | 9/1995 | Kephart | 714/38.1 |
| 6,976,170 | B1 * | 12/2005 | Kelly | 713/181 |
| 6,978,419 | B1 * | 12/2005 | Kantrowitz | 715/209 |
| 7,356,188 | B2 * | 4/2008 | Venkatesan et al. | 382/229 |

* cited by examiner

*Primary Examiner* — Steven B Theriault
(74) *Attorney, Agent, or Firm* — Casimir Jones, S.C.

(57) ABSTRACT

The present invention provides methods for integrating the peer review process with other applications and facilitating peer review using a user interface linked to a peer review application having knowledge base information and defined rules for: accepting a paper for peer review, assigning the paper to one or more of a defined set of reviewers for review, providing to the reviewers one or more criteria to be used for reviewing and evaluating each paper for enabling each reviewer to create a peer review result, and processing all peer review results for any paper to produce a peer review report. Access to these systems and methods may be provided, for example, on a stand-alone computer or over the Internet, World Wide Web, or an intranet.

11 Claims, 37 Drawing Sheets

Figure 7 email this student: jbarrie@iparadigms.com turnitin originality report info

| | |
|---|---|
| **author:** | Barrie, John M. |
| **ID:** | 42234 |
| **assignment:** | 1 |
| **uploaded:** | 04/01/2001 10:53:38 PDT |
| **title:** | Whale Camp |
| **word #:** | 1304 |

We found (4) documents, either within our local database or on the Internet, that contain similar or exact passages to those in your paper.

Overall Similarity Index

Least similar 1 2 3 4 5 Most similar links

The Internet addresses listed below contain passages that match text in the submitted paper. You can click on any of the links below to open a window to that Internet location, or select "dsc" (direct source comparison) to open a window that hones directly in on the passages in question.

| URL | % of match | exclude | dsc |
|---|---|---|---|
| http://www.fairisaac.com/servlet/SiteDriver/Content/8 | 12% | N/A | |
| http://amber.aae.uiuc.edu/~m-selig/uiuc_lsat/lsat_4bulletin.html | 1% | N/A | |
| http://www.dogbreedinfo.com/leonberger.htm | 15% | N/A | |
| http://www.scalecombat.com/sections/workshop/aerodynamics.htm | 16% | N/A | |

text

Whale Camp

Forty-six miles of bumpy dirt road and three miles of water separate Whale Camp from the small mission town of San Ignacio. In the back of the Ford van, we felt every bump, and the wash board sections tried to shake us apart.

There are laws of motion that effect aerodynamic theory. The first of these is Equilibrium. If a body is in equilibrium, then its tend to remain so. A model standing still on a table is in equilibrium unless something disturbs it by accelerating it in some direction. A moving model flying straight and level in calm air, at a constant speed and not turning is in a balanced state or equilibrium and will have a tendency to stay that way if it is trimmed properly. The same could be said for a model that is climbing or diving at a constant speed. Equilibrium is a condition of steady motion or rest, in contrast to states of unsteady motion involving acceleration negative acceleration or deceleration. (Paragraph lift)

Heavy rains the past week had caused the desert to erupt in a crimson and yellow rash. Every turn unveiled a new vignette of perfect desert landscaping. A fantastic exhibition of cactus shapes and sizes floated on a sea of tiny blossoms. Crimson hillsides glowed in the warm sun. The air was delicately seasoned with a hint of sweetness. The ostentatious display continued for miles as the narrow dirt road bumped and meandered through the desert.

This is a very large, majestic dog with a characteristic black mask. Males have a majestic male head and the females should have a somewhat smaller more feminine head. The black mask The mask should not extend above the eyebrows; the mask can be up to eyes or above the eyes, but never the complete head. The nose and lips are black.

In males with a very majestic male head slightly loose flews and sometimes slightly open hooks of eyes, are often found. Loose flews collect saliva, so some males might drool slightly. The teeth should meet in a tight scissors bite. The skull is somewhat domed. It is important that the brown eyes have a gentle, kindly expression. The hanging ears are medium-sized. The neck should be strong with no dewlap.

The rough-looking waterproof coat is tawny to reddish-brown and may have black tipped hair on the outer coat. A small white star on the chest and a little white on the tip of the paws are permitted. There is always discussion about the amount of white aloud. FCI standard states "like the palm of a hand". But it all depends on who's hand you are referring to.

After two and a half-hours, we reached Kujima - the end of the road. From there, the seven of us and all our gear were piled into two small white and blue skiffs to traverse the three miles of lagoon to the camp. The

Figure 14
your classes
change user type
user info
log out
help!
Welcome, John M. Barrie.
turnitin
Art Center College of Design
Department
Advanced Painting [---]
inbox
students
assignments
turn it in!
reviews
calendar
class notes
preferences
English 1A
Review assignment step 5 (of 5):
summary
This is a preview of your peer review assignment. If you would like to update any of the sections, just click on the "update" button next to the section you would like to change.
General info:
review assignment:
assignment used:
start date:
due date:
post date:
students are sent:
students choose:
review title:
Sample Peer Review Assignment
description:
Here is the description.
instructions:
Here are some instructions.
Section A: Topic questions
1. General - Please review this manuscript from the perspective of a 19th century peasant.
2. Thesis/introduction - Identify the student's thesis. Does the student provide sufficient supporting evidence to create a convincing thesis? If you believe the thesis is convincing, state the evidence the student provides that strengthens his thesis. Otherwise, if you find the student's thesis unconvincing or believe the student provides insufficient support for the thesis, suggest how the student could improve the efficacy of his thesis.
Section B: Rubrics
1. Thesis/introduction - Rate the appropriateness of the student's thesis as it relates to the course.
2. Conclusion - Rate the content of the paper and its potential contribution to the course.
3. Organization - Rate the student's command of grammar.
4. Conclusion - Rate the student's ability to raise issues relevant to the course.
5. Thesis/introduction - Rate the student's effectiveness in supporting the paper's thesis.
If you have no further changes and would like to send this peer review assignment to your students, click

Figure 15
your classes change user type user info log out help!
Welcome, John M. Barrie.
turnitin
Art Center College of Design
Department
Advanced Painting [---]
inbox students assignments turn it in! reviews calendar class notes preferences English 1A
This is your assignments page, which shows all of the assignments you have created for this class. There are two assignment types at Turnitin.com: "paper" assignments, which you create for students to submit papers for plagiarism protection, and "peer review" assignments, which allow students to anonymously review previously submitted peer papers.
create a new paper assignment:
create a new peer review assignment:
type start: due/end: post: exchange U T title
1 2001-10-21 2001-11-11 N A N A Figure Drawing I
2 2002-01-18 2002-01-22 2002-01-31 Pr Assignment #1
3 2002-01-20 2002-01-29 2002-01-29 Pr Assignment #2
5 2002-01-21 2002-01-22 2002-01-25 New Title
6 2002-01-25 2002-01-28 2002-01-26 Newest Pr Assignment
7 2002-01-26 2002-01-29 2002-01-30 Newest Pr Assignment (Copy Of #6)
8 2002-01-28 2002-01-30 2002-01-30 Sample Peer Review Assignment

Figure 23A

Turnitin.com help

Our online help system is designed to provide detailed help information specific to the page you are currently visiting. Below, you will find detailed information about each component of the current Turnitin.com page. In addition to these help screen, we have a downloadable user manual available in PDF or Word formats. If all else fails, write to us at: helpdesk@Turnitin.com.

The page you currently visiting contains the following elements:

System Navigation Bar:

1. YOUR CLASSES: Click here to view your list of classes.
2. CHANGE USER TYPE: Click here to change your user type. Account administrators have administrator, faculty, and student access while faculty users have faculty and student access.
3. USER INFO: Click here to access your user profile. From this screen you may also update information including your password and email address.
4. LOG OUT: Click here to end your session and return to the Turnitin.com home page.
5. HELP!: Click here for page-specific help.

Account Navigation Bar:

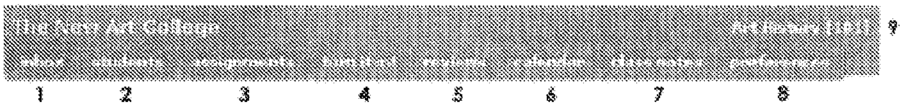

1. INBOX: Click here to return to your class inbox.
2. STUDENTS: Click here to see a list of students enrolled in this class.
3. ASSIGNMENTS: Click here to create and update paper or peer review assignments.
4. TURN IT IN!: Click here to submit papers to Turnitin.com for analysis.
5. REVIEWS: Click here to access Turnitin.com's Peer Review.
6. CALENDAR: Click here to access Turnitin.com's Calendar of assignments, lecture notes, office hours, and holidays.
7. CLASS NOTES: Click here to access your lecture notes. These notes are accessible to students enrolled in your class.
8. PREFERENCES: Click here to view and change your class preferences.
9. The right side of your account navigation bar displays the CLASS you are currently visiting.

Report Viewing Bar:

This tool allows you to choose the type of which assignments and reports you wish to view.

1. Use this bar to select new papers, archived papers, or both. Click GO to activate your selection
2. Use this bar to select the desired peer review or paper assignment. You can view one assignment at a time, or all at once. Click GO to activate your selection.
   Note: Your inbox will either display paper or peer review submissions depending upon whether you choose to view paper or peer reveiw assignments.
3. Use the checkboxes to select the results you would like displayed. Click GO to activate your selections. ("No boxes checked" is the default; both "no boxes" and "all boxes" display all results.)

Class Inbox:

Note: Your class inbox toggles between displaying paper submissions with originality reports and peer reviews. To view your report inbox, select a paper assignment from the assignment menu. To view peer review submissions, select a peer review assignment from the assignment menu.

Report Inbox: The report inbox allows you to view papers and their originality reports.

Figure 23B

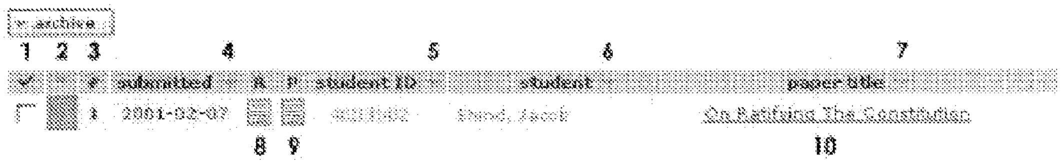

1. ARCHIVE/UN-ARCHIVE: check the papers you would like to archive or unarchive, then click on the archive button to activate. When you are viewing new papers, the "archive" button will be displayed. When you are viewing archived papers, the "un-archive" button will displayed. When you are viewing all papers, there will be no button, but the status of any paper will be indicated by a "+" or "-" sign.
2. Sort by ORIGINALITY RESULT: Click on the sort icon to sort displayed papers by their color-coded "overall similarity index."
3. This column displays the assignment number of the paper submission.
4. Sort by DATE SUBMITTED: Click on the sort icon to sort displayed papers by submission date.
5. Sort by STUDENT ID: Click on the sort icon to sort displayed papers by student ID.
6. Sort by STUDENT name: Click on the sort icon to sort displayed papers by alphabetized student names. Note: Students whose papers were submitted by their instructor will be displayed in red and will not link to personal student information.
7. Sort by PAPER TITLE: Click on the sort icon to sort displayed papers by their alphabetized titles.
8. Click on the ORIGINALITY REPORT icon to view a paper's detailed "Originality Report."
9. Click on the PAPER icon to view the text of a submitted paper."
10. Click on the PAPER TITLE to view the text of a submitted paper."

Peer Review Inbox: This peer review inbox allows you to view peer reviews.

1. ARCHIVE/UN-ARCHIVE check the papers you would like to archive or unarchive, then click on the button to activate. When you are viewing new papers, the "archive" button will be displayed. When you are viewing archived papers, the "un-archive" button will displayed. When you are viewing all papers, there will be no button, but the status of any paper will be indicated by a "+" or "-" sign.
2. This column displays the ASSIGNMENT NUMBER of the paper submission.
3. Sort by DATE SUBMITTED: Click on the sort icon to sort displayed peer reviews by submission date.
4. Sort by REVIEW AUTHOR: Click on the sort icon to sort displayed peer reviews by the peer review author's name.
5. PEER REVIEW: Click on the icon to view a paper's detailed "Peer Review."
6. Sort by PAPER TITLE: Click on the sort icon to sort displayed peer reviews by the title of the reviewed paper.
7. This column displays the PAPER AUTHOR of the paper that has been submitted to the current peer review assignment.
8. SCORE: Click on the sort icon to sort displayed peer reviews by their numeric score.
9. TITLE: Click on the paper's title to view the text of the submitted paper.

SYSTEMS AND METHODS FOR FACILITATING ORIGINALITY ANALYSIS

CROSS REFERENCE TO RELATED APPLICATIONS

This application is a continuation of U.S. application Ser. No. 11/803,605, filed: May 15, 2007, which is a continuation of U.S. application Ser. No. 10/087,118, filed: Mar. 1, 2002, now U.S. Issued Pat. No. 7,219,301, both of which are herein incorporated by reference in their entirety.

FIELD OF THE INVENTION

The present invention relates generally to systems and methods for conducting peer review. More particularly, the present invention relates to systems and methods for an automated peer review process.

BACKGROUND OF THE INVENTION

Peer review is a method used by Universities, Scholarly Journals, Government Agencies, Foundations and the like to review and evaluate the worthiness or value of papers submitted, for example as a part course work, or for publication, or as a proposal for a grant. Schools, and in particular primary and secondary schools, also use peer review to provide feedback for improvement. Peer review is typically carried out by several reviewers, to mitigate the effect of any prejudice which may influence the opinion of a single reviewer. The reviewers typically analyze the papers for strengths and weaknesses, and typically provide a written end result, such as, for example, comments, a grade, a recommendation with respect to publication or funding, and/or suggestions for improvement. Current methods for peer review suffer from problems of being too time consuming, wasteful in that a complete set of documents must typically be produced for each reviewer, and costly when such documents must be delivered to, and returned by, each reviewer by post or courier. In addition, it may not be possible when conducting peer review using manual means to completely obviate any prejudice through randomness or anonymity when desired, since a human is involved in manual methods of selecting and distributing papers to reviewers, and may either overtly or inadvertently communicate information regarding the authors to the reviewers. Moreover, in a school environment where handwritten papers are turned in, handwriting is frequently recognizable and identifiable as belonging to a particular individual, making a true "blind" review impossible.

What is needed are systems and methods for efficiently automating the process of peer review, while providing flexibility which has hitherto not been available through manual methods.

SUMMARY OF THE INVENTION

The present invention relates to automated systems and methods for conducting peer review. In one embodiment, the present invention provides a peer review system including a user interface for identifying the user, for accepting predefined user information, and for providing a result.

There are typically three distinct kinds of users: sponsors, submitters, and reviewers. Sponsors are those who require or invite the submission of papers and define the criteria for the peer review. Submitters are those who create and submit the papers to be reviewed. Reviewers are those who review the papers. Sometimes the reviewers may also be the submitters or the sponsors.

In the present invention, a peer review application is operably linked to the user interface and includes knowledge base information and defined rules for (1) accepting a paper for peer review, (2) defining the peer review assignment; (3) assigning the paper to one or more of a defined set of reviewers for review, (4) providing to each reviewer the criteria for reviewing each said paper to produce a peer review result, and (5) processing all peer review results for a paper to produce a peer review report for that paper. A peer review application of the present invention is stored on a computer system having computer memory and a computer processor. An intermediary service provider is most preferably operably linked to said computer system, for displaying the user interface and the result to the user via, for example, the internet or an intranet.

The criteria by which a paper is distributed for peer review preferably includes rules for randomly assigning said paper to any reviewer except the submitter, and for assigning to each reviewer only the number of papers predetermined by the sponsor. Moreover, the identification of the submitter of each paper can be controlled to provide a true, double-blind review in which the identity of the submitters are not disclosed to the reviewers.

In the present invention, the system includes as a part of the knowledge base information selectable reviewing and/or grading criteria to be used in evaluating a paper. The sponsor may choose from among the stored criteria, or may create new reviewing criteria. Where new reviewing criteria are created by the sponsor, the peer review application can supplement the knowledge base information by adding the new grading criteria.

In some embodiments, the peer review application is stored on computer readable medium (e.g., DVDs, CDs, hard disk drives, magnetic tape and servers for streaming media over networks). In other embodiments, the peer review application is stored on computer memory or a computer memory device.

In some embodiments, the computer system comprises computer memory or a computer memory device and a computer processor. In some embodiments, the computer memory (or computer memory device) and computer processor are part of the same computer. In other embodiments, the computer memory device or computer memory are located on one computer and the computer processor is located on a different computer. In some embodiments, the computer memory is connected to the computer processor through the Internet or World Wide Web. In some embodiments, the computer memory is on a computer readable medium (e.g., floppy disk, hard disk, compact disk, DVD, etc). In other embodiments, the computer memory (or computer memory device) and computer processor are connected via a local network or intranet.

In some embodiments, "a processor" may in fact comprise multiple processors in communication with each other for carrying out the various processing tasks required to reach the desired end result. For example, the computer of an intermediary service provider may perform some processing and the computer of a customer linked to the intermediary service provider may perform other processing.

In some embodiments, the computer system further comprises computer readable medium with the peer review application stored thereon. In further embodiments, the computer system comprises the computer memory, computer processor, and the peer review application is located on the computer memory, and the computer processor is able to read the peer review application from the computer memory (e.g., ROM or other computer memory) and perform a set of steps according to peer review application. In certain embodiments, the computer system may comprise a computer memory device, a computer processor, an interactive device (e.g., keyboard, mouse, voice recognition system), and a display system (e.g., monitor, speaker system, etc.).

In yet another embodiment, the present invention provides a method of peer review including (1) providing a user interface capable of receiving user information, including information for identifying the user; (2) providing a peer review application linked to the user interface, and including knowledge base information and defined rules for (a) accepting a paper for peer review, (b) defining a peer review assignment; (c) assigning the paper to one or more of a defined set of reviewers for review, (d) providing criteria to the reviewers for reviewing each said paper to produce a peer review result, and (e) processing all peer review results for any paper to produce a peer review report; (3) providing a computer system for operating the peer review application, wherein the computer system includes computer memory and a computer processor, (4) providing a hosted electronic environment operably linked to the computer system; (5) displaying the user interface on the hosted electronic environment; (6) receiving user information by way of the user interface; and (7) processing the user information with the peer review application to generate a peer review report for each paper submitted for review.

In some embodiments of the system and methods of the present invention, the user interface is a written document capable of being viewed by a user. In further embodiments, the user interface is telephone, modem, or other electronic device capable of receiving responses from a user (e.g., responsive to pre-recorded telephone message of questions or questions presented by an operator). In preferred embodiments, the user interface is a graphical user interface (e.g., a user interface screen presented on a computer monitor).

In some embodiments of the methods of the present invention, the user information is received by way of the user interface. While it would be possible to receive user information by receiving oral communications, or by receiving a written document from user, in the preferred embodiments, the receipt of the user information is by way of electronic communication (e.g., over telephone lines, cable lines, or a broadcast electronic communication), and most preferably by information entered into a web site.

In some embodiments of the methods of the present invention, user information is processed with the peer review application to generate a peer review report. In some embodiments, the peer review application is operably linked to the computer processor such that the peer review application is able to process the user information. In some embodiments, the peer review application is physically located in the same computer as the computer processor. In other embodiments, the peer review application is in a different computer than the computer processor and the peer review application and computer processor are operably linked (e.g., there is an electronic connection between the computer processor and the peer review application). In some embodiments, the electronic connection is selected from phone lines, cable lines, broadcast transmission, or combinations thereof.

In certain embodiments, the user information provided by sponsors identify the sponsor and allow the system to verify the user as a sponsor for access purposes. Sponsor user information can also comprise or define, for example, information identifying users having access to their site, information identifying a set of submitters and/or a set of reviewers, information defining the parameters of a peer review assignment, such as, for example, last date for submission of papers, last date for completion of the peer review assignment, the criteria for reviewing papers, the method for assignment of papers to reviewers (random allocation, manual assignment, reviewer choice, or a combination thereof).

In certain embodiments, the user information provided by submitters identify the submitter, allowing access to information provided by the sponsor such as, for example, information relating to the submission of papers. Papers submitted are provided with identification indicia which link the paper to the reviewer for purposes, among others, of creating and distributing the peer review report.

In certain embodiments, the user information provided by reviewers identify them as reviewers, allowing access to information provided by the sponsor, such as, for example, information regarding the selection or assignment of papers to be reviewed and the criteria to be used in reviewing each paper assigned for review, and the date by which the peer review assignment is to be completed.

In the preferred embodiment of the present invention, the peer review report combines the peer review results for each submitted paper into a single document. Preferably, the peer review report is displayed on a computer screen. Alternatively, the results can be displayed on paper. In particularly preferred embodiments, the results are displayed on a web site.

In certain embodiments, the intermediary service provider comprises a hosted electronic environment. In some embodiments, the hosted electronic environment is located on the Internet. In other embodiments, the hosted electronic environment is located on the world wide web. In still other embodiments, the hosted electronic environment is located on an intranet. In preferred embodiments, the hosted electronic environment comprises a web site.

DESCRIPTION OF THE FIGURES

FIG. 7 shows a user interface screen provided in one embodiment of the peer review application of the present invention.

FIG. 23*a* shows a first page of a user interface screen provided in one embodiment of the peer review application of the present invention;

FIG. 23*b* shows a second page of a user interface screen provided in one embodiment of the peer review application of the present invention;

DETAILED DESCRIPTION OF THE INVENTION

Figure 1:
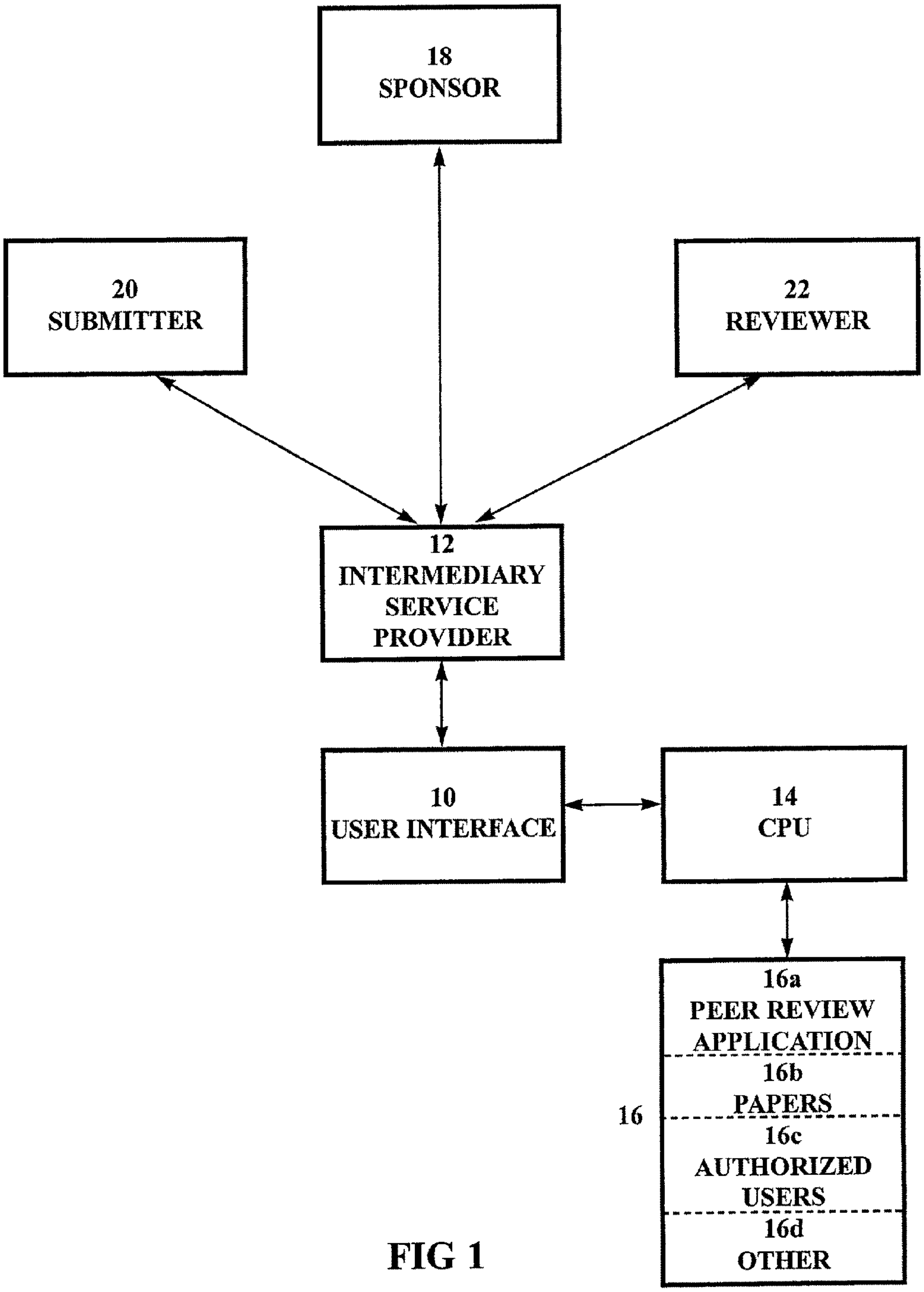
FIG. 1 illustrates a preferred embodiment of a system of the present invention.

The present invention relates to systems and methods for performing peer review. For example, the present invention provides systems, methods, and software tools for automatically generating peer review reports based upon predetermined criteria defined by the person or entity seeking the review. Most preferably, the peer review systems and methods of the present invention are integrated into a broader system for managing projects, academic environments and the like.

To facilitate an understanding of the present invention, a number of terms and phrases are defined below:

As used herein, the term "intermediary service provider" refers to an agent providing a forum for users to interact with each other (e.g., identify each other, make and receive assignments, etc). For example, an intermediary service provider may provide a forum for faculty members to create and distribute assignments to students in a class (e.g., by defining the assignment and setting dates for completion), or provide a forum for students to receive and respond to assignments such as peer review assignments. The intermediary service provider also allows, for example, users to maintain a portfolio of work submitted in response to all assignments for a particular class or project and for the collection of data (such as customized questions and rubrics) which can be used to supplement knowledge base data in a library of such data. In some embodiments, the intermediary service provider is a hosted electronic environment located on the Internet or World Wide Web.

As used herein, the term "link" refers to a navigational link from one document to another, or from one portion (or component) of a document to another. Typically, a link is displayed as a highlighted or underlined word or phrase, or as an icon, that can be selected by clicking on it using a mouse to move to the associated page, document or documented portion.

As used herein, the term "Internet" refers to a collection of interconnected (public and/or private) networks that are linked together by a set of standard protocols (such as TCP/IP and HTTP) to form a global, distributed network. While this term is intended to refer to what is now commonly known as the Internet, it is also intended to encompass variations which may be made in the future, including changes and additions to existing standard protocols.

As used herein, the terms "World Wide Web" or "Web" refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

As used herein, the term "Web Site" refers to a computer system that serves informational content over a network using the standard protocols of the World Wide Web. Typically, a Web site corresponds to a particular Internet domain name, such as "proveit.net/" and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users.

As used herein, the term "client-server" refers to a model of interaction in a distributed system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on a computer of a user; the program which responds to browser requests by serving Web pages is commonly referred to as a "Web server."

As used herein, the term "HTML" refers to HyperText Markup Language which is a standard coding convention and set of codes for attaching presentation and linking attributes to informational content within documents. During a document authoring stage, the HTML codes (referred to as "tags") are embedded within the informational content of the document. When the Web document (or HTML document) is subsequently transferred from a Web server to a browser, the codes are interpreted by the browser and used to parse and display the document. Additionally in specifying how the Web browser is to display the document, HTML tags can be used to create links to other Web documents (commonly referred to as "hyperlinks").

As used herein, the term "HTTP" refers to HyperText Transport Protocol which is the standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET, causes the server to return the document or file located at the specified URL.

As used herein, the terms "computer memory" and "computer memory device" refer to any storage media readable by a computer processor. Examples of computer memory include, but are not limited to, RAM, ROM, computer chips, digital video disc (DVDs), compact discs (CDs), hard disk drives (HDD), and magnetic tape.

As used herein, the term "computer readable medium" refers to any device or system for storing and providing information (e.g., data and instructions) to a computer processor. Examples of computer readable media include, but are not limited to, DVDs, CDs, hard disk drives, magnetic tape and servers for streaming media over networks.

As used herein, the terms "computer processor" and "central processing unit" or "CPU" and "processor" are used interchangeably and refers to one or more devices that is/are able to read a program from a computer memory (e.g., ROM, RAM or other computer memory) and perform a set of steps according to the program.

As used herein, the term "hosted electronic environment" refers to an electronic communication network accessible by computer for transferring information. One example includes, but is not limited to, a web site located on the world wide web.

As shown in FIG. 1, the preferred system of the present invention includes a user interface 10 operably connected to a computer processor 14 in communication with computer memory 16. Computer memory 16 can be used to store a peer review application 16*a* of the present invention, along with a central data base including papers submitted for review 16*b*, data for identifying subscribers 16*c* and other data and applications 16*d*. Most preferably, access to the user interface 10 is controlled through an intermediary service provider 12, such as, for example, a website offering a secure connection following entry of confidential identification indicia, such as a user ID and password, which can be checked against the list of subscribers 16*c* stored in memory. Upon confirmation, the user is given access to the site. Alternatively, the user could provide user information to sign into a server which is owned by the customer and, upon verification of the user by the customer server, the user can be linked to the user interface 10.

User interface 10 can be used by a variety of users to perform different functions, depending upon the type of user. For purposes of the present invention, there are preferably at least three categories of users (although other users may also be defined and given access): sponsors 18, submitters 20, and reviewers 22. Sponsors 18 are those who require or invite the submission of papers, and define the parameters of those papers, including content. In an academic environment, this category typically includes teachers or professors. Submitters 20 are those who prepare and submit papers for review. In an academic environment, this typically includes students. Reviewers 22 are those who review the submitted papers for quality, and for compliance with the parameters and criteria defined by the sponsor. In an academic environment, reviewers can be the teacher or professor of the class for which the paper was submitted, other teachers or professors (e.g., members of a thesis or dissertation committee), or students. Indeed, the practice of having students exchange and grade tests and quizzes in class has been a common practice. While the preferred embodiment of the present invention is carried out in an academic setting, one skilled in the art will recognize that the present invention can also be applied to a variety of other peer review situations, such as, for example, evaluating papers for publication, and reviewing grant proposals.

Figure 2A:
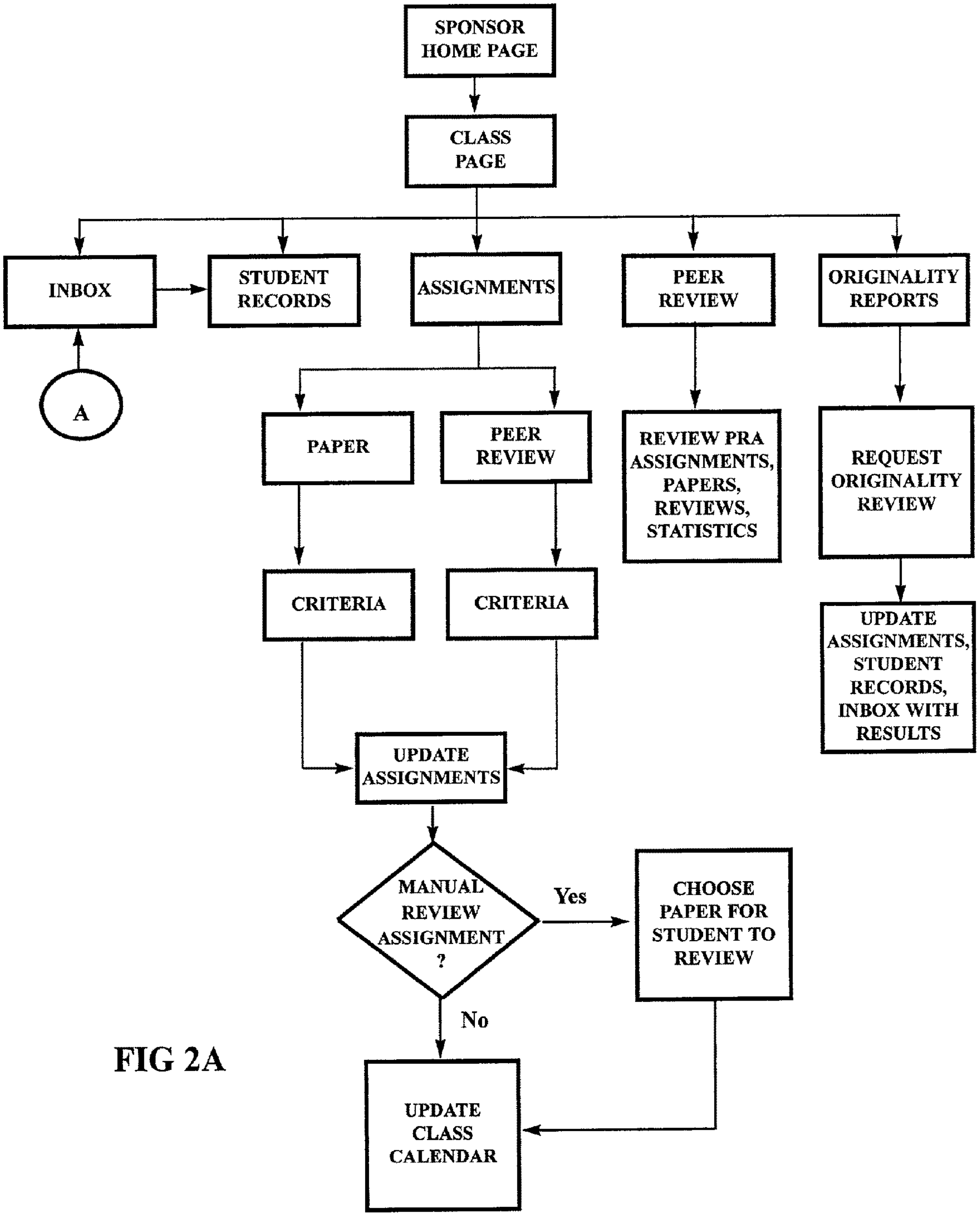
FIG. 2*a* illustrates the process followed by a sponsor when using a peer review application of the present invention.
Figure 2B:
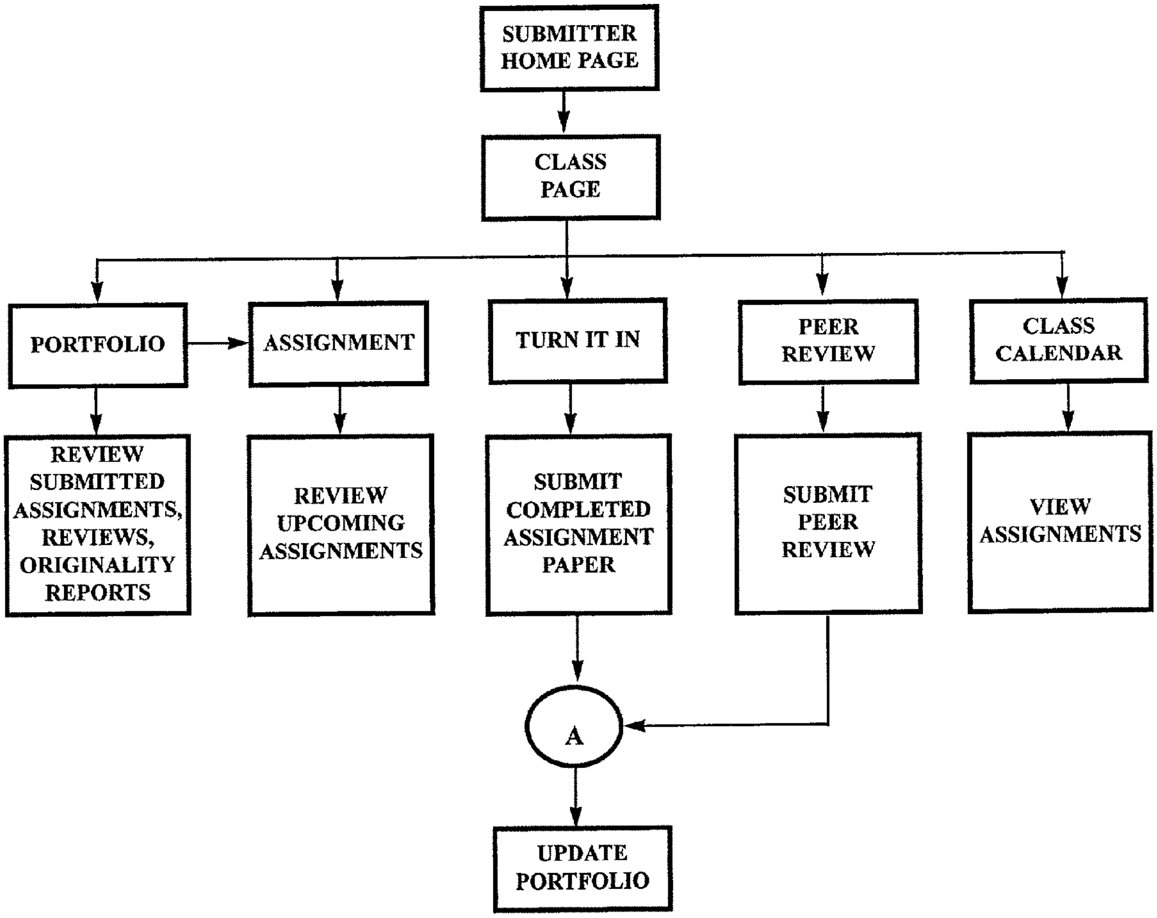
FIG. 2*b* illustrates the process followed by a submitter when using a peer review application of the present invention.
Figure 2C:
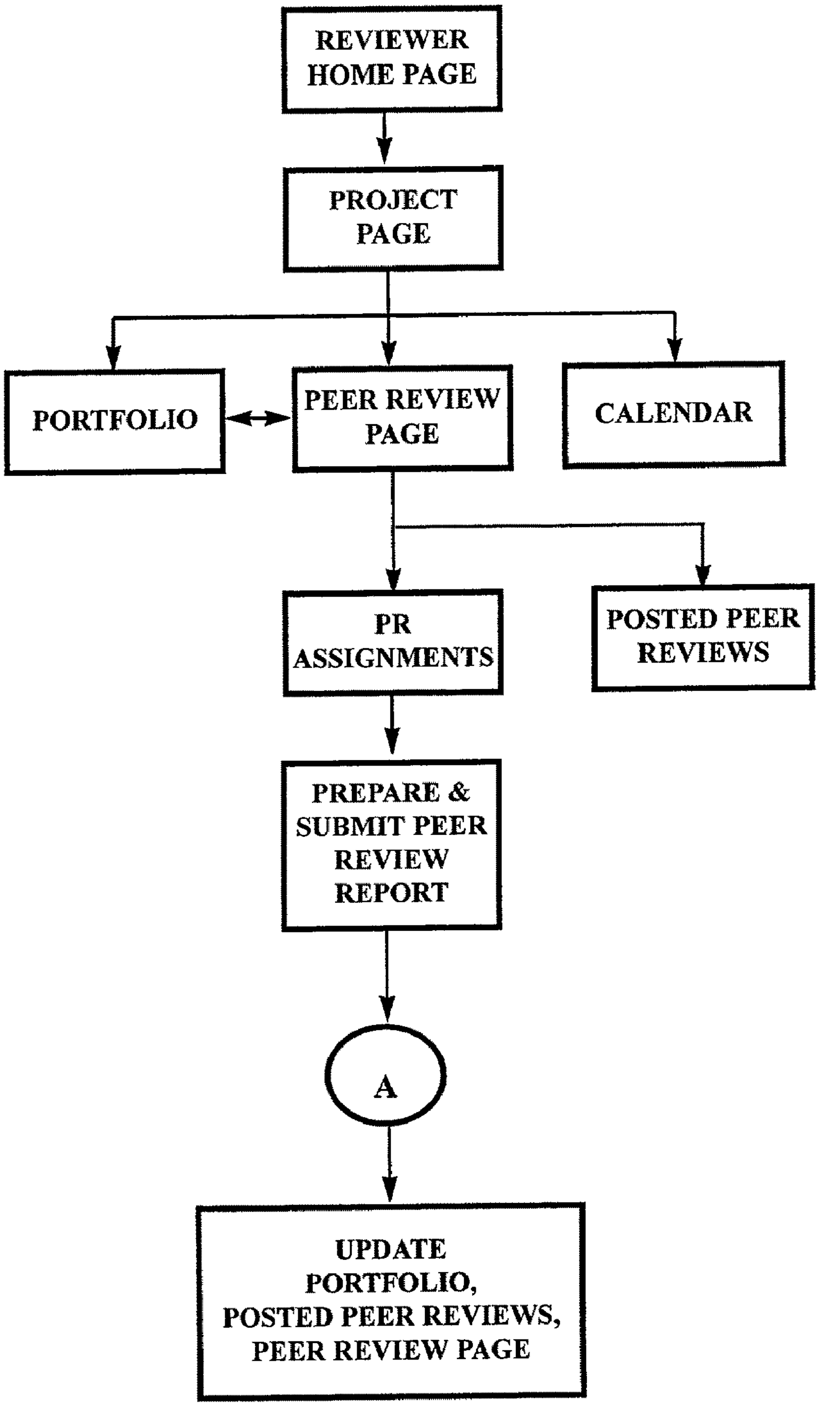
FIG. 2*c* illustrates the process followed by a reviewer when using a peer review application of the present invention.
Figure 3:
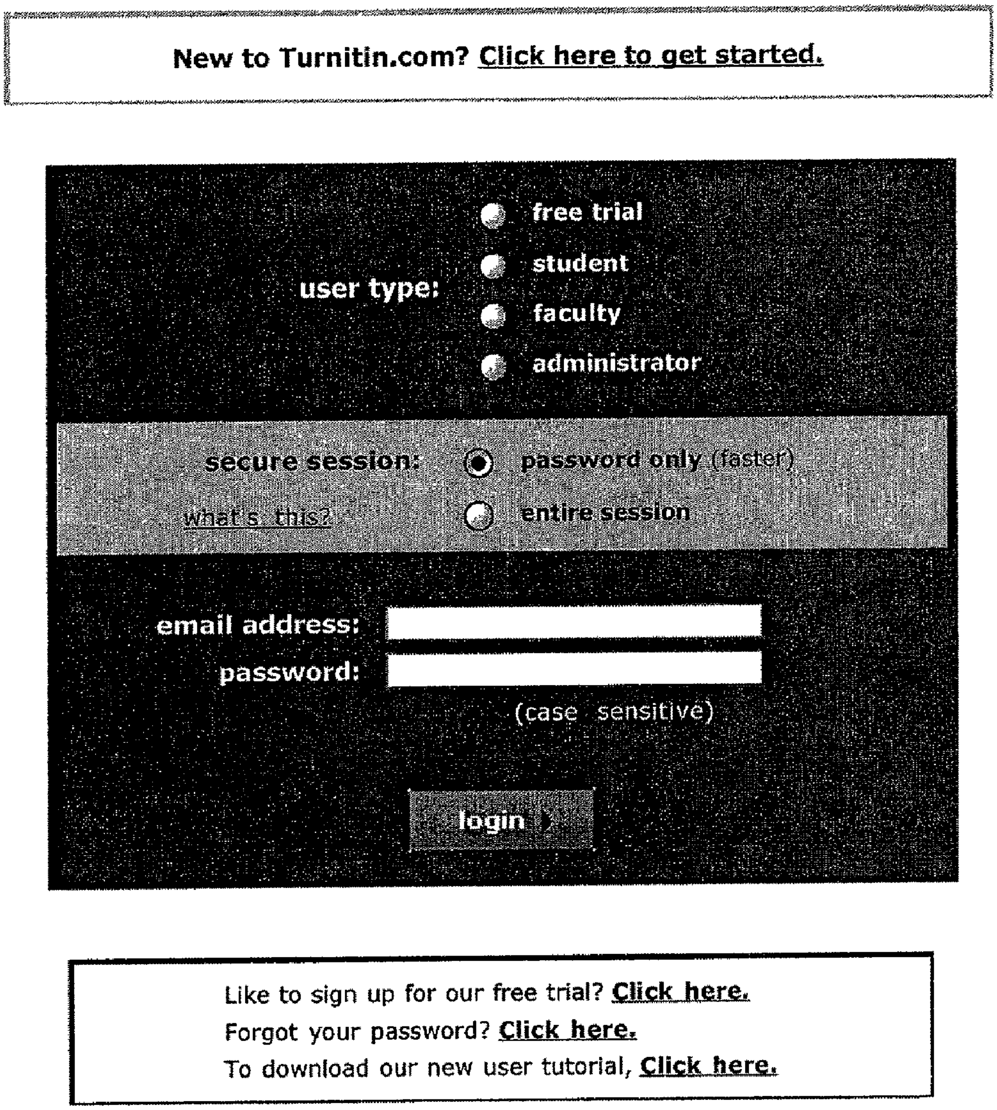
FIG. 3 shows a user interface screen provided in one embodiment of the peer review application of the present invention.

As shown in FIGS. 1-3, users preferably access the user interface 10 by using a remote computer, internet appliance, or other electronic device with access to the internet and capable of linking to an intermediary service provider 12 operating a designated website (such as, for example, turnit-in.com) and logging in. Alternatively, if elements of the system are located on site at a customer's location or as part of a customer intranet, the user can access the interface by using any device connected to the customer server and capable of interacting with the customer server or intranet to provide and receive information.

The user provides predetermined identification information (as shown in FIG. 3, this can include user type, email address, and password) which is then verified by checking a "central database" containing the names of all authorized users stored in computer memory 16. If the user is not found in the central database, access is not provided unless the "free trial" option has been selected, and then access is only provided to sample screens to enable the unknown user to evaluate the usefulness of the system. The central database containing the identification information of authorized users could be maintained by the intermediary service provider or by a customer. If the user is known (i.e., contained within the list of authorized users), the user will then be given access to an appropriate "home page" based on the type of user and the user ID which links to subscription information and preferences previously selected by the user. Thus, "home pages" with relevant information can be created for sponsors, submitters, and reviewers.

The login screen shown in FIG. 3 allows the user to select the type of user interface to be accessed. Such a choice is convenient where an individual user fits into more than one category of user. For example, where an individual user is both a faculty member and a student in a class, allowing the individual to choose the user type will bring up the appropriate interface screen. In situations where there can be no overlap, such a choice, while preferable, will not be necessary since the central database can include each individual user's user type and can automatically bring up the appropriate user interface screen when the user signs in and is recognized. The user may also be given the option of selecting a secure session.

Use of the System by Sponsors

Figure 4:
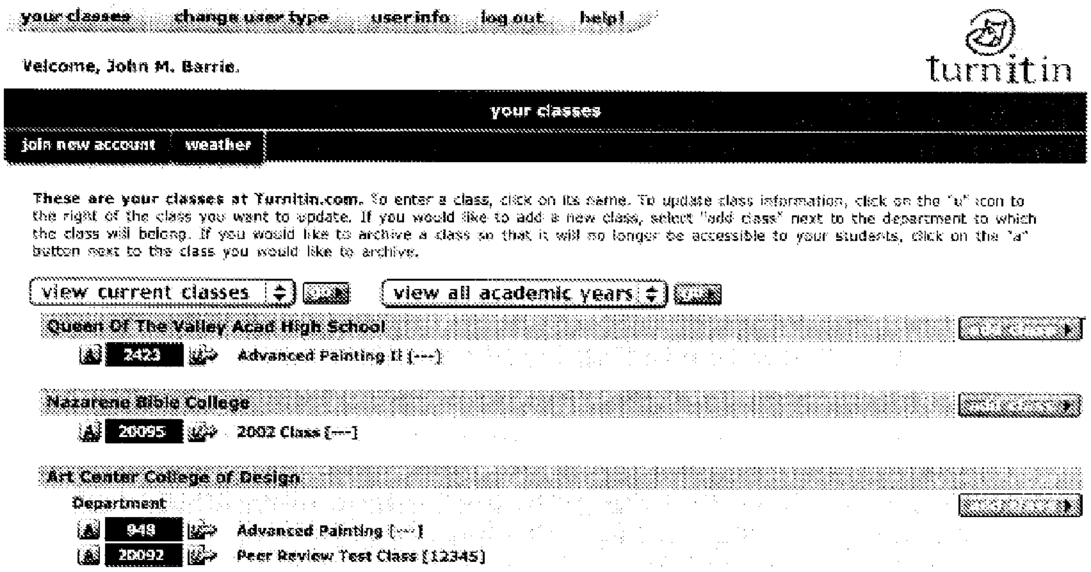
FIG. 4 shows a user interface screen provided in one embodiment of the peer review application of the present invention.

As shown in FIGS. 1, 2*a* and 4, a sponsor accesses the user interface and logs in to the system to call up the sponsor's homepage. The sponsor's homepage will list all classes, projects or accounts being tracked for the sponsor. In the embodiment shown in FIG. 4, the sponsor is a teacher tracking classes at three institutions. By selecting a particular class, the sponsor can access the records for that class. Using this screen, the sponsor can add classes or projects by clicking on the "add class" icon to the right of the institution name, or archive classes by clicking on the "A" icon to the left of the class name. To check on the records for a specific class, the sponsor can click on the name of the class.

Figure 5:
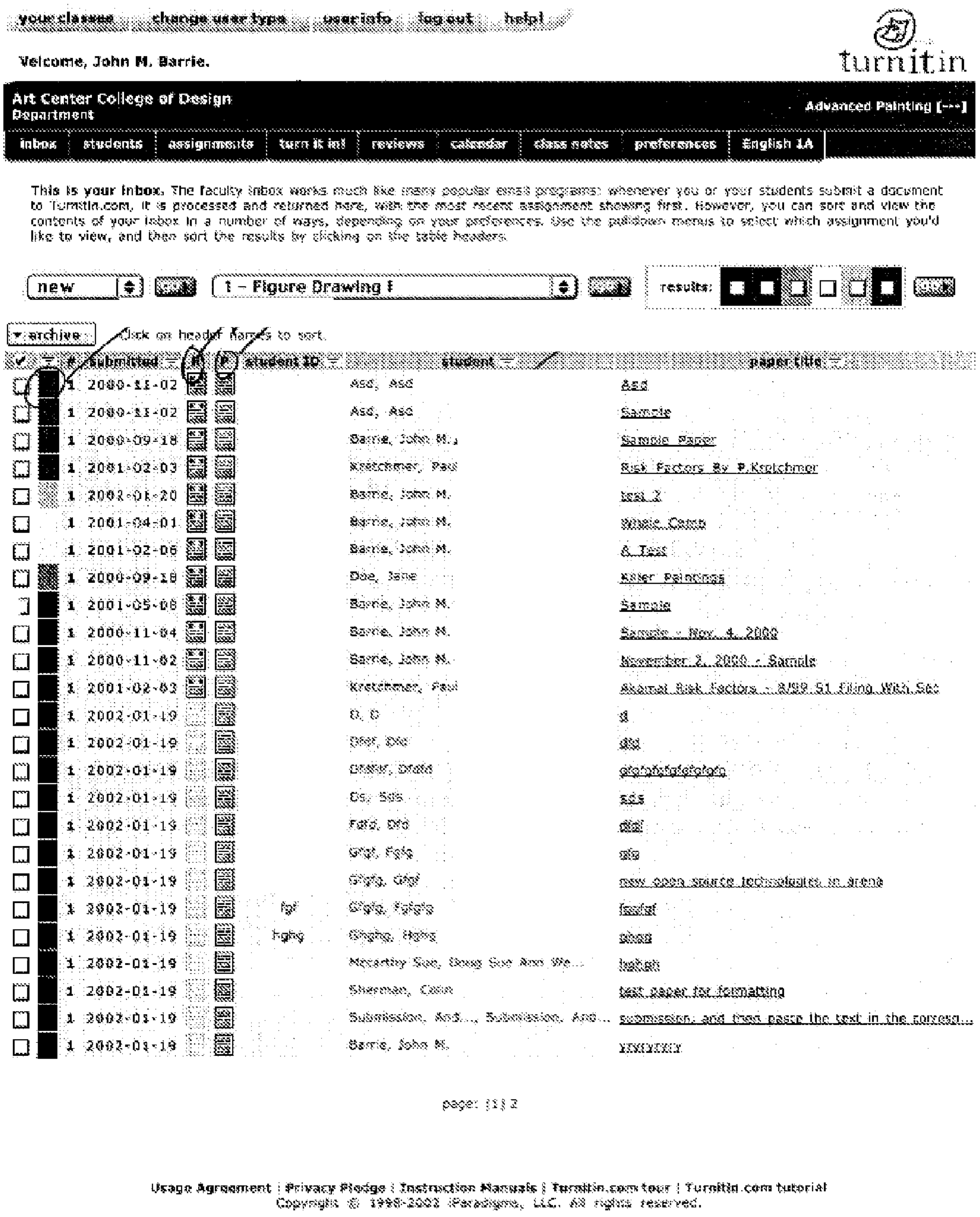
FIG. 5 shows a user interface screen provided in one embodiment of the peer review application of the present invention.

As shown in FIG. 5, a variety of class records can be maintained and accessed automatically. A class page navigation bar at the top of the page contains links which allow the sponsor to view a variety of records: "Inbox" can contain originality reports for papers turned in for the class; "Students" can contain a list of students in the class and links to their records; "Assignments" can contain a list of assignments for the class; "Reviews" can contain the peer review assignments for the class; "Calendar" can contain the due dates and post dates for assignments and peer reviews, holidays etc.; "Class Notes" can be used to post class notes; "Preferences" can be used by the Sponsor to set parameters for use of the system. Throughout the system, where the file contains more than one page, the page being viewed and all pages in the file can be shown, for example, at the bottom of the page, e.g.: page: [1] 2. The bracketed number is the page being viewed; the next page can be called up by clicking on the next number. In addition, other general information regarding use of the system can be accessed by clicking on links at the bottom of the page. Such general information can include the agreement regarding usage of the system, privacy obligations, instruction manuals for using the system, a tour of the system for first-time users, and/or a tutorial. Although these links are not shown in the remaining Figures, they preferably appear at the bottom of every screen when the system is in use.

FIG. 5 shows a class inbox, which can contain all submissions made to that class by each of the enrolled students, and can identify each assignment by student name, date submitted, and title. Icons provide links to the full text paper (under column "P") and to any originality reports which have been generated to check for plagiarism (under the column "R"). The sponsor is also given the ability to archive submitted work by checking the block to the far left of each submission. This would be useful for archiving the work of a submitter/student who has withdrawn before completion of the project/class or for archiving old work.

Figure 6:
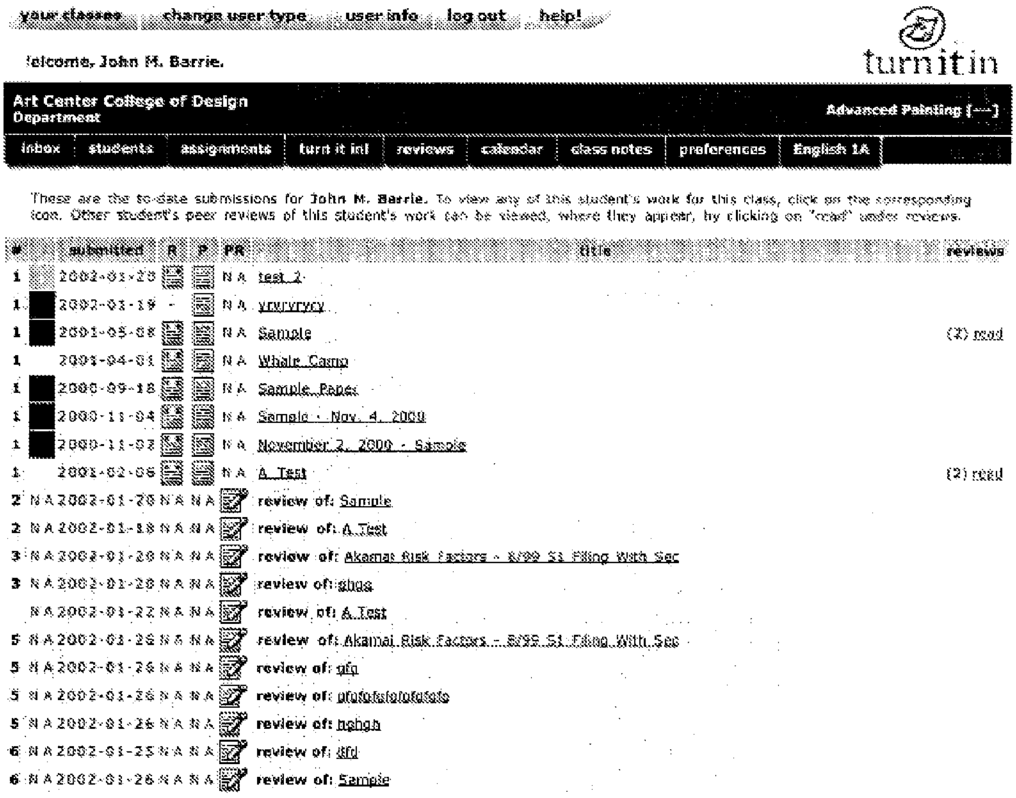
FIG. 6 shows a user interface screen provided in one embodiment of the peer review application of the present invention.

To view a portfolio of any specific student's work, the sponsor can click on the student's name. As shown in FIG. 6, this produces a complete history of the student's submissions for the class. The sponsor can view any of the submissions by clicking on the appropriate icon. For example, the sponsor can view the originality report for the paper entitled "test 2" by clicking on the icon under the column "R" on the first line. The sponsor can read the full text of the paper entitled "test 2" by clicking on the icon under the column "P" on the first line, or by clicking on the title "test 2". The sponsor can review the two peer reviews of this student's paper entitled "A Test" by clicking on the "read" icon under the far right column "reviews." The sponsor can read the peer review submitted by this student on 26 Jan. 2002 for another student's paper entitled "sample" by clicking on the icon under the column "PR" on the last line.

As shown in FIG. 7, the originality report for the paper "Whale Camp" shown in FIG. 6 can be reviewed by clicking on the icon in column "R" to the left of the title "Whale Camp." When a student paper is submitted in response to an assignment, preferably by uploading it to the central database, originality can be determined by performing an originality analysis. The sponsor can initiate this process by selecting the account navigation bar icon "turn it in!" and selecting papers which have been submitted for originality analysis.

Originality analysis is a process which typically consists of producing a digital fingerprint for the paper, and comparing the paper's digital fingerprint to the digital fingerprints of termpapers and documents stored in a database or gathered from the internet. Documents having digital fingerprints identified as a close match are then preferably compared full-text to the full-text paper to determine the level of duplication. An originality report, shown in FIG. 7, can be created which includes a graphical indication of the likelihood of originality ("overall similarity index" ranking originality from 1 (least similar) to 5 (most similar)) and provides links to documents which contain matching passages, to enable the sponsor to view the flagged passages and make a judgment on whether plagiarism has occurred. In addition, textual passages in the paper for which matches were found can be identified.

In the preferred embodiment, the steps of the process are carried out by the intermediary service provider, and the report is generated and accessible to the sponsor through the user interface. However, some institutions may wish to maintain control over their student's papers. In such cases, it is possible to divide the processing between the customer's server and the intermediary service provider's server. For example, the papers may be uploaded and stored in the customer's database, and the customer's processor will create a fingerprint of the paper. The fingerprint can be checked by the customer's processor against the fingerprints of other papers stored on the customer's database. Then, the fingerprint of the paper can be transmitted to the intermediary service provider for processing (e.g., comparison with the other documents stored by the intermediary service provider). Either the intermediary service provider server can then do the final, full-text comparison to produce the originality report, or the intermediary service provider server will transmit to the customer server the information regarding the documents which were identified as potential "hits" during the comparison, so that the customer server can produce the final originality report.

Figure 8:
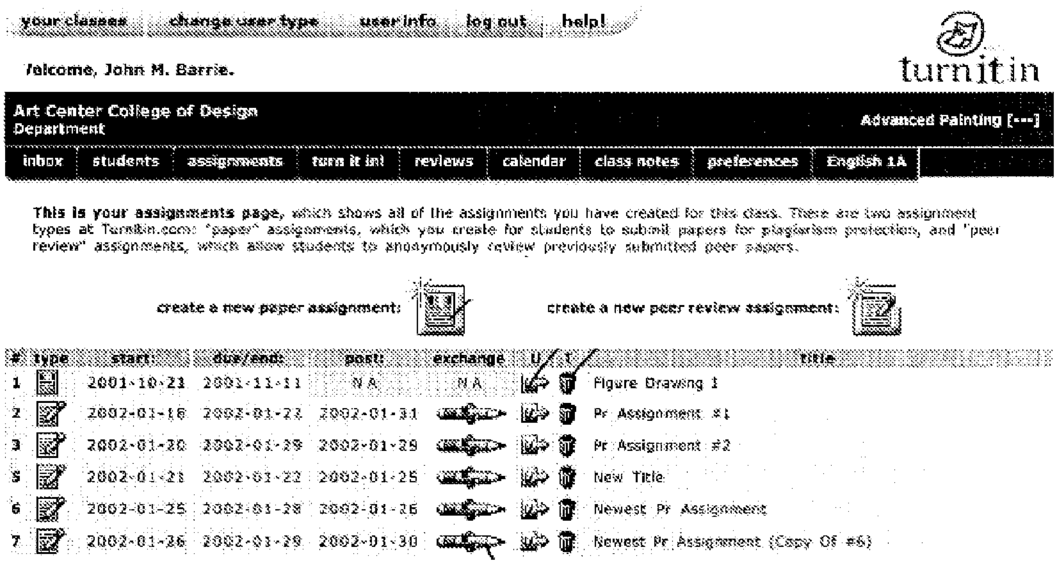
FIG. 8 shows a user interface screen provided in one embodiment of the peer review application of the present invention.

The "assignments" account navigation bar icon provides access to the assignments page, an example of which is shown in FIG. 8. This page shows all assignments for the class, including start date, due or end date, a "post" date (when students may be given access to peer reviews and/or grades for the assignment), and a title. A reminder date may also be selectable, whereby a reminder (for example, by email) can be sent to the submitter to remind the submitter of the due date for the assignment. The sponsor can update the assignment by selecting the "U" icon or delete the assignment by selecting the trashcan icon. In the preferred embodiment, two kinds of assignments can be created: a new paper assignment or a new peer review assignment. To create a new paper assignment, the sponsor clicks on the new paper assignment icon to access an assignment screen identifying the title, description, and instructions for completing and uploading the new paper assignment.

Figure 9:
FIG. 9 shows a user interface screen provided in one embodiment of the peer review application of the present invention.

In the preferred embodiment, the sponsor can select a complete peer review assignment from a library of complete peer review assignments, or can create a new peer review assignment using a five step process is used to define the peer review assignment. To create a new peer review assignment, the sponsor selects the "create a new peer review assignment" icon to access the screen shown in FIG. 9.

In the first step, a title for the peer review assignment is provided by the sponsor along with any description and/or additional instructions desired by the sponsor. The sponsor then selects the "next" icon to go to step 2.

Figure 10:
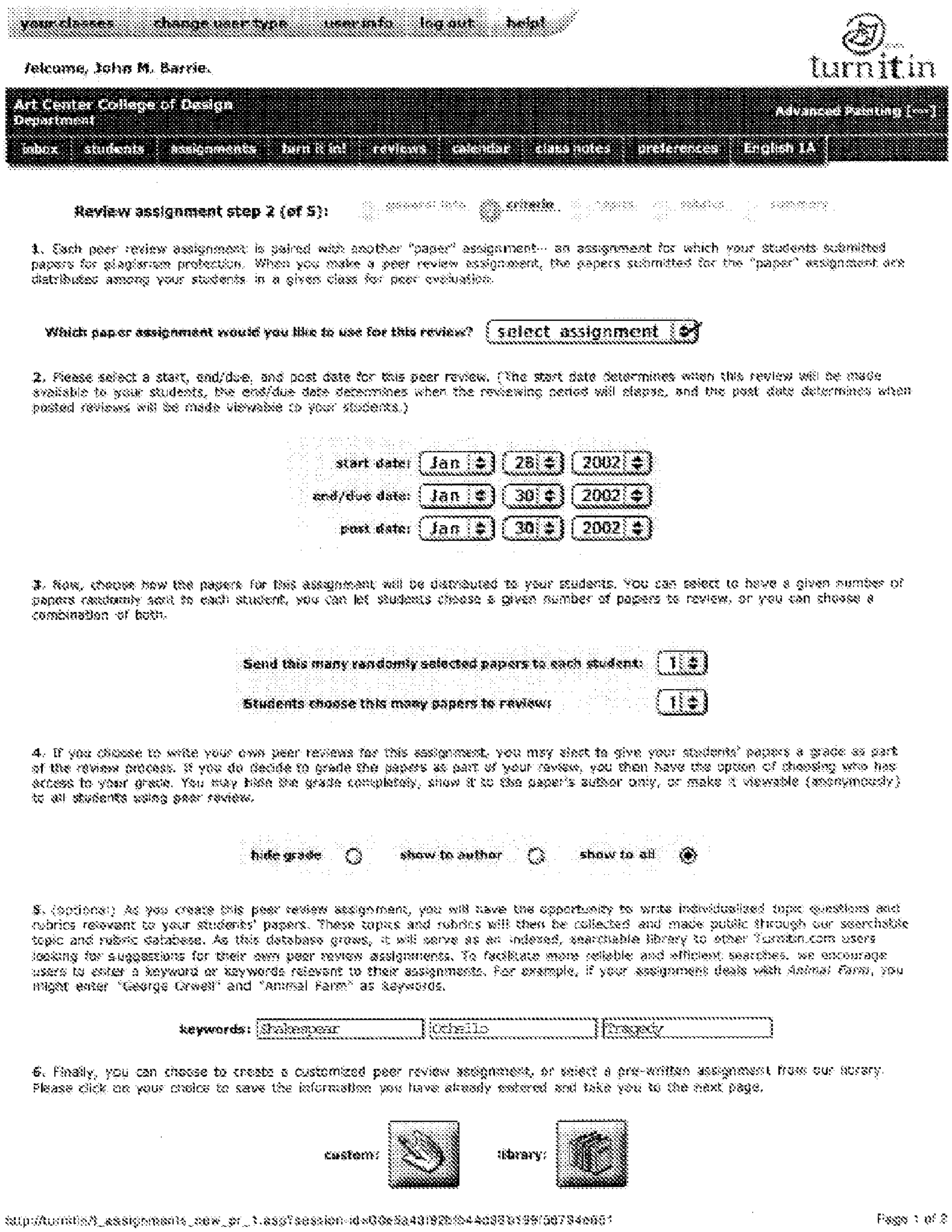
FIG. 10 shows a user interface screen provided in one embodiment of the peer review application of the present invention.

As shown in FIG. 10, the criteria for the peer review assignment can be established by the sponsor. These criteria preferably include (1) identity of the paper assignment this peer review is to be paired with; (2) relevant dates such as, for example, a start date, a due date (e.g., the date by which the peer review must be completed and uploaded), a post date (e.g., the date when the results of the peer review will be available to interested parties), and possibly a reminder date (e.g., the date on which a reminder will be sent to the reviewers to remind them of the upcoming due date for the completion of the peer review assignment); (3) the method by which the papers will be distributed to the students/reviewers; (4) dissemination of ratings for the reviewed papers; and (5) keywords related to the assignment to enable the sponsor to access and review relevant topical questions to be answered by the reviewers stored in the central data base.

The sponsor is preferably able to change the assignment if necessary before the "start" date. The sponsor can also, if desired, select a "post date" which occurs after the due date to provide adequate time for the sponsor to check all reviews and make any adjustments to grades which might be warranted under the circumstances.

The method by which papers will be distributed to the students/reviewers is also preferably selectable to allow the sponsor to determine whether papers will be distributed to individuals or to groups. Where distribution is to occur to individuals, the sponsor will preferably be able to determine how many papers each student will review and to choose random or manual distribution of papers. Where distribution will occur to groups, the sponsor will identify the groups and then determine the method by which papers will be distributed to each group (e.g., manually, randomly, or by exchange between groups).

Before the peer review assignment is created, and before distribution occurs, the sponsor may wish to review each paper submitted to make certain that personally identifiable information is not included in the body of the paper. Assuming anonymity is desired, and any such personally identifying information is removed, the method of distribution can be determined.

For example, as shown in FIG. 10, the sponsor has chosen to have each student review two papers, and has selected one paper to be randomly assigned to each student, and to allow manual assignment of one paper to each student. Random assignment will most preferably distribute a paper randomly to the universe of students who are not the author. Likewise, manual selection will preferably be controlled to prevent review of a paper by its author and to remove manually selected papers from the universe of papers available for review to insure that all papers receive neither more nor less than the desired number of reviews. This can be done by allowing students to select any paper other than their own and papers already selected by others, or by allowing the faculty member to manually assign papers to students.

The sponsor can also determine whether or not a grade will be given and/or who will have access to the grade received by any paper. The choices provided by FIG. 10 include "hide grade" (the grade is only known to the sponsor and is not disclosed to submitters, reviewers or others), "show to author" (the grade is only transmitted to the paper's author), or "show to all" (the grade for each paper is disclosed to all authorized users).

Finally keywords can be provided to enable the sponsor to access questions and rubrics stored in the library. By selecting the "custom" icon (to create custom topics) or the "library" icon (to select stored topics) at the bottom of FIG. 10, the sponsor moves to step 3.

Figure 11:
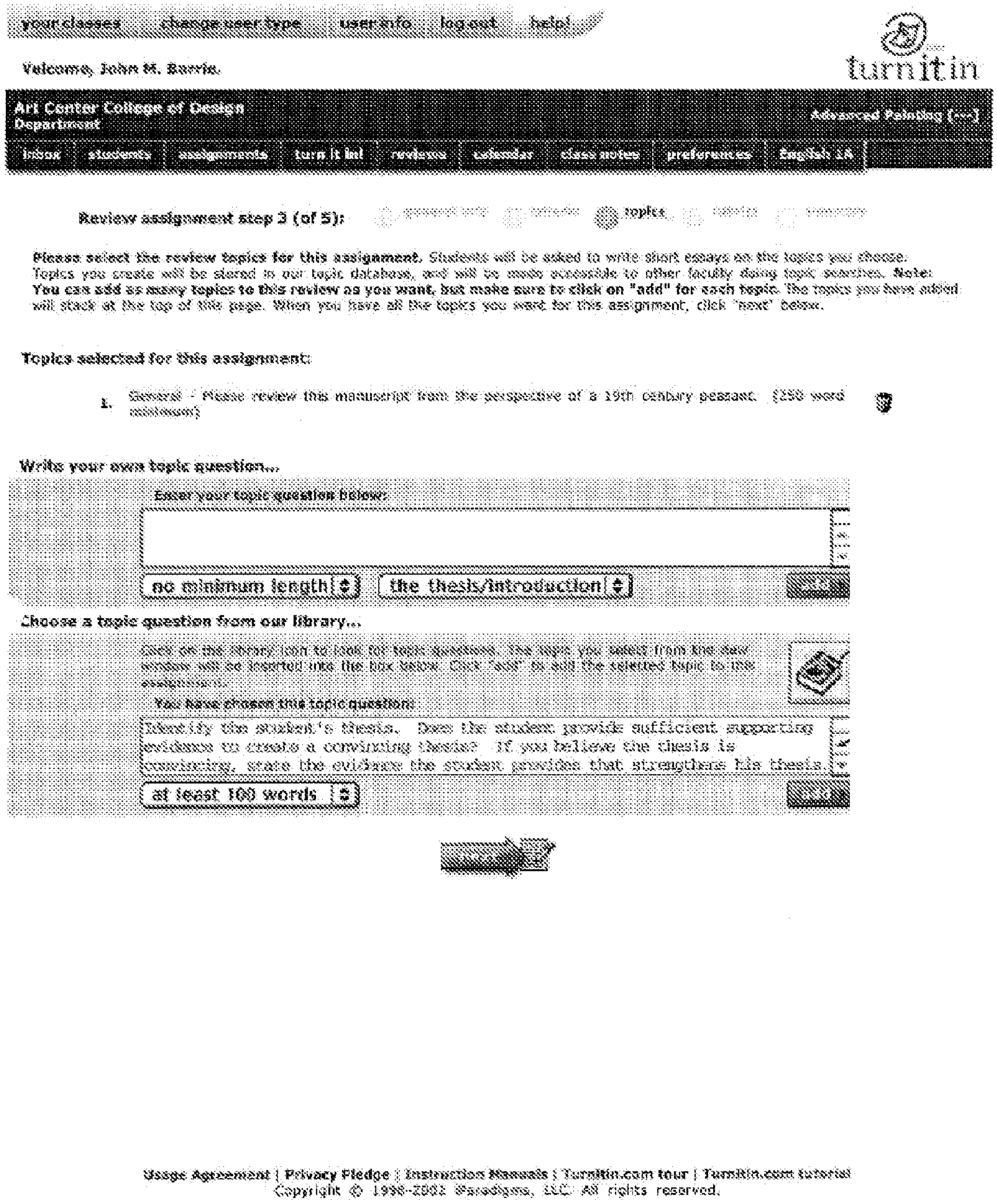
FIG. 11 shows a user interface screen provided in one embodiment of the peer review application of the present invention.
Figure 12:
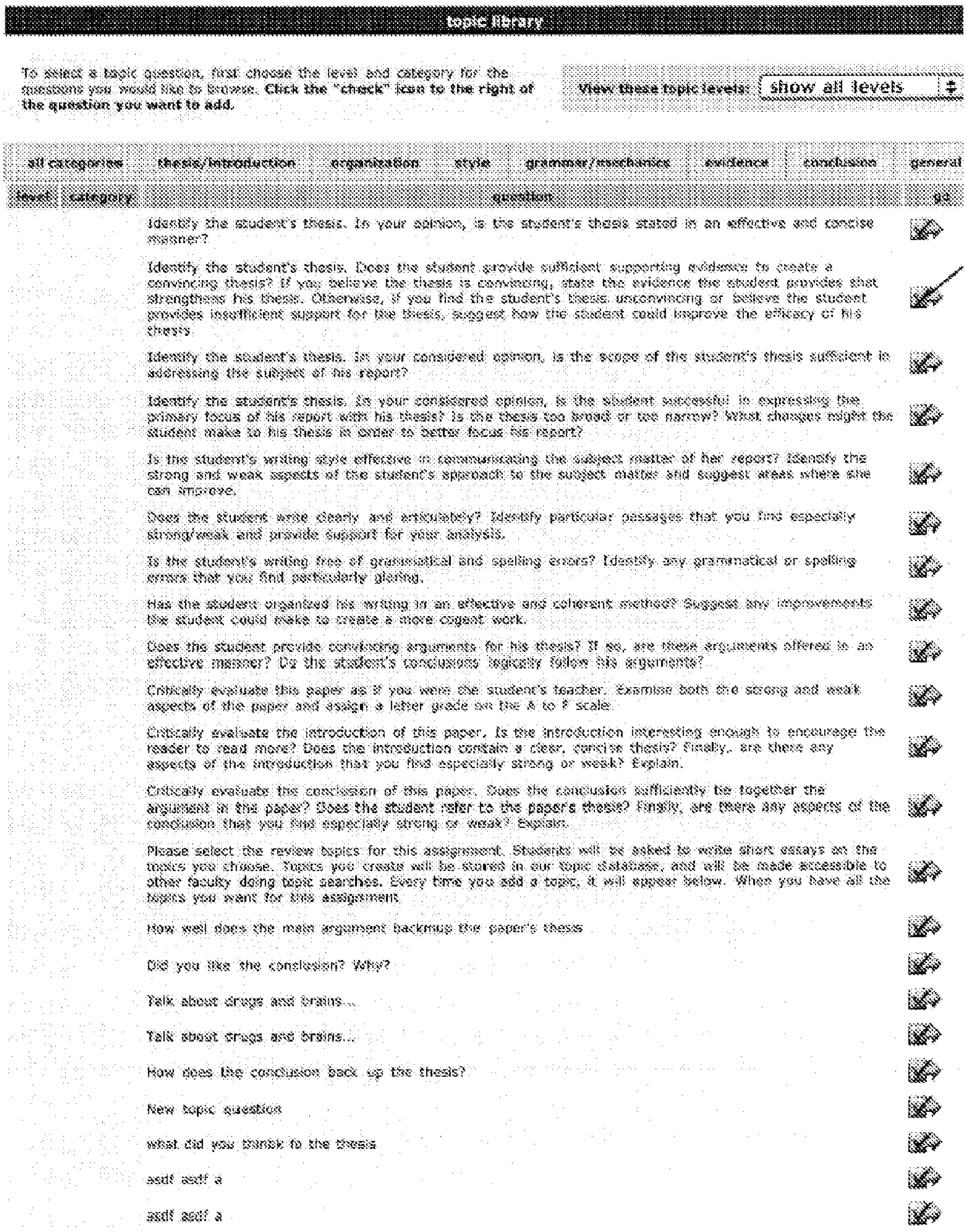
FIG. 12 shows a user interface screen provided in one embodiment of the peer review application of the present invention.

As shown in FIG. 11, the sponsor can select or create criteria, such as topical questions to be answered by the reviewer, and the minimum length, if any, for the response. The topic question can be created by the sponsor or selected from one or more libraries of topic questions (an example of which is shown in FIG. 12). The system most preferably allows sponsors to add questions to a library. For example, the sponsor may wish to add standard questions used in the past by the sponsor, or questions recommended by a textbook publisher, or state or district educational authority. The sponsor preferably is given the choice to share such questions or rubrics with other sponsors.

Stored topic questions can be conveniently categorized into sublibraries directed to such areas as thesis/introduction, organization, style, grammar/mechanics, evidence, conclusion, and general, with each sublibrary accessible by selecting the appropriate icon. When a desirable topic question is located, it can be used in the assignment by selecting or clicking on the "check" icon to the right of the question to be added. When the sponsor creates a new topic questions, the library is preferably supplemented by adding the new topic questions.

When acceptable topic questions have been created or selected, the sponsor selects the "next" icon at the bottom of the page to move to step 4.

Figure 13:
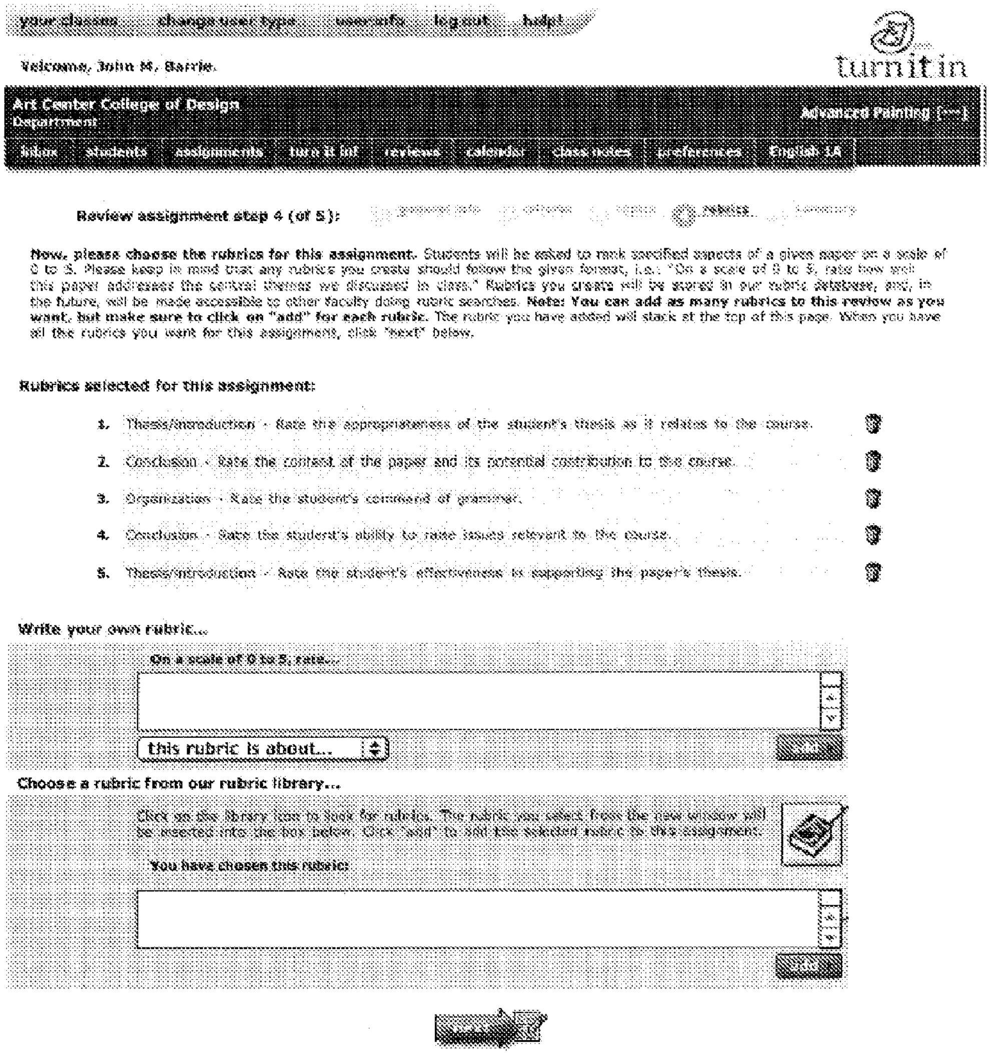
FIG. 13 shows a user interface screen provided in one embodiment of the peer review application of the present invention.

As shown in FIG. 13, the sponsor can establish yet other criteria in the form of rubrics for rating selected aspects of the paper. A rubric is a question which asks the reviewer to rate an aspect of the paper on a defined scale, for example: "From 0 to 5 rate the student's effectiveness in identifying the principal leadership characteristics of Napoleon Bonaparte." Preferably a library of stored rubrics is accessible to the sponsor by selecting the rubric library icon. Where a sponsor creates a new rubric, the library is preferably supplemented by adding the newly-created rubric. Once all rubrics have been selected, the sponsor selects the "next" icon to advance to the final step.

Figure 14:
FIG. 14 shows a user interface screen provided in one embodiment of the peer review application of the present invention.

As shown in FIG. 14, the final step allows the sponsor to review all the criteria for the peer review assignment, and to make any changes needed, before selecting the "submit" icon to create the peer review assignment.

Figure 15:
FIG. 15 shows a user interface screen provided in one embodiment of the peer review application of the present invention.

As shown in FIG. 15, once the "submit" icon is selected, the Assignments page shown in FIG. 8 is updated, for example by adding the newest assignment to the bottom of the list. Alternatively, it would also be possible to update or supplement the assignment page by adding the newest assignment to the top of the list of assignments, or by sorting alphabetically, by end date, by start date, or by any other sortable criteria. This screen also allows the sponsor to create a manual paper exchange for peer review purposes, by selecting the pencil icon under the column marked "exchange". When this icon is clicked, the "exchange" screen shown in FIG. 16 is accessed.

Figure 16:
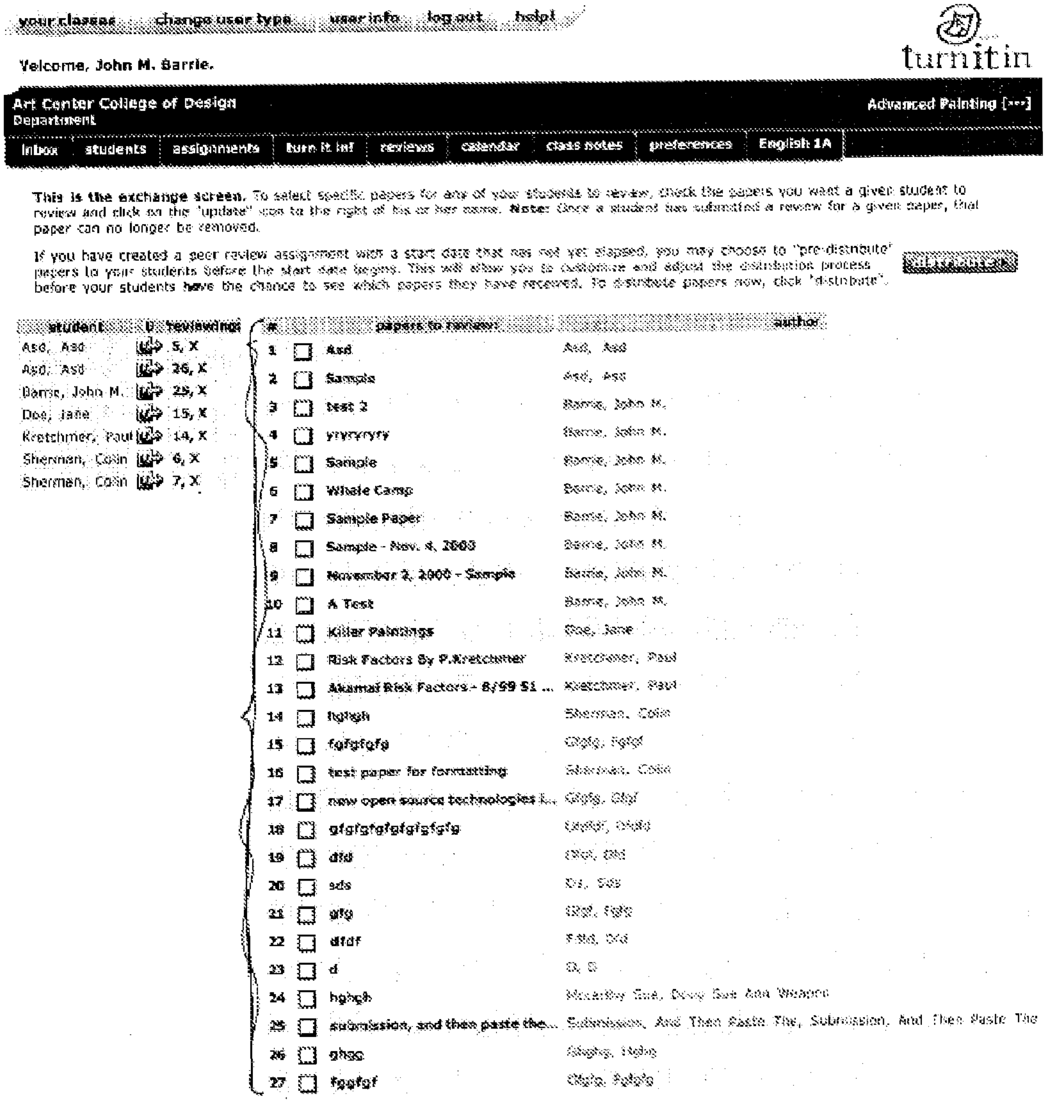
FIG. 16 shows a user interface screen provided in one embodiment of the peer review application of the present invention.

Using the "exchange" screen of FIG. 16, the sponsor can manually assign for review specific papers to specific students. The sponsor needs only select a paper then click the update icon next to the name of the student he wishes to review the selected paper. The number of the paper then appears in the "reviewing" box next to the student's name. The "x" appearing in the box identifies a random paper assignment to be made by the system. In the event of manual assignment, the system for randomly assigning papers would eliminate both the manually assigned paper, as well as any papers authored by the reviewer, from the universe of papers to be randomly assigned, to prevent possible duplication (i.e., a reviewer being assigned the same paper twice, or a paper authored by the reviewer). In the preferred embodiment, manual assignment of papers to review through the "exchange" screen takes place prior to the "start" date selected for the assignment. Once an assignment is made, the information identifying the assignment is preferably posted to a central class or project calendar (FIG. 17) accessible to all relevant users. The central calendar can also be used to provide other information or links such as, for example, scheduling information, holidays, office hours, lecture notes, examinations, tests and quizzes, announcements, and the like. For convenience, this page is preferably accessible from other pages in the sponsor/faculty user class interface by selecting the "calendar" class account navigation bar icon.

Figure 18:
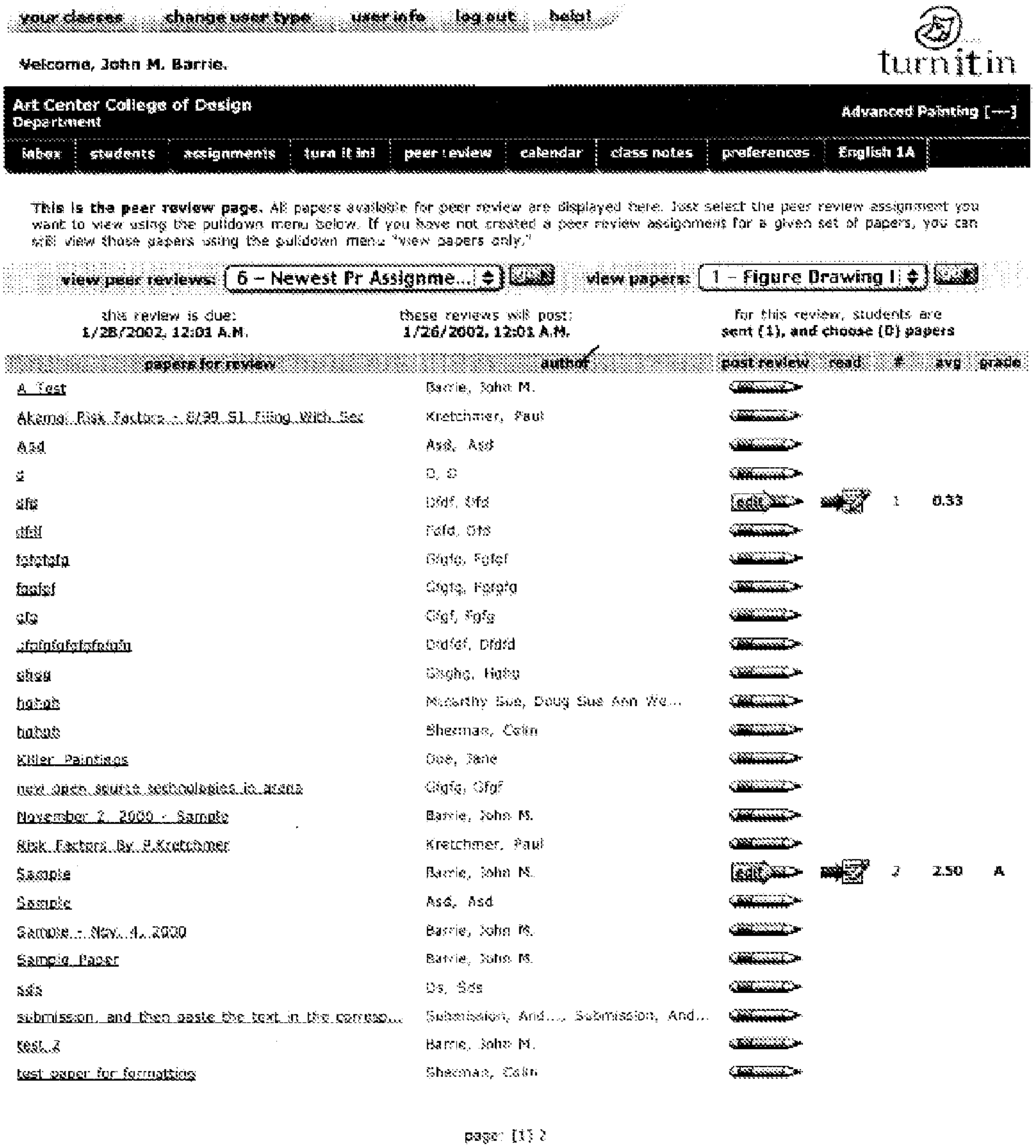
FIG. 18 shows a user interface screen provided in one embodiment of the peer review application of the present invention.

The status of the peer review assignments can be viewed by selecting the "peer review" account navigation bar icon to access the page shown as FIG. 18. This page allows the sponsor to read student papers, view peer review summary statistics and grades, and to read the reviews of the papers. This page preferably identifies each paper to be reviewed and the author of each paper, along with the due date and posting date. When a review is posted/uploaded, the number of reviews posted to date is shown for each paper, as is the score or average score if more than one review has been posted. When all reviews have been posted, a grade is also assigned based on predetermined criteria. An icon is preferably activated when a review is posted which permits the sponsor to read all reviews which have been posted. In addition, the sponsor may also create a review of the paper by selecting the pencil icon in the "post review" column.

Figure 19:
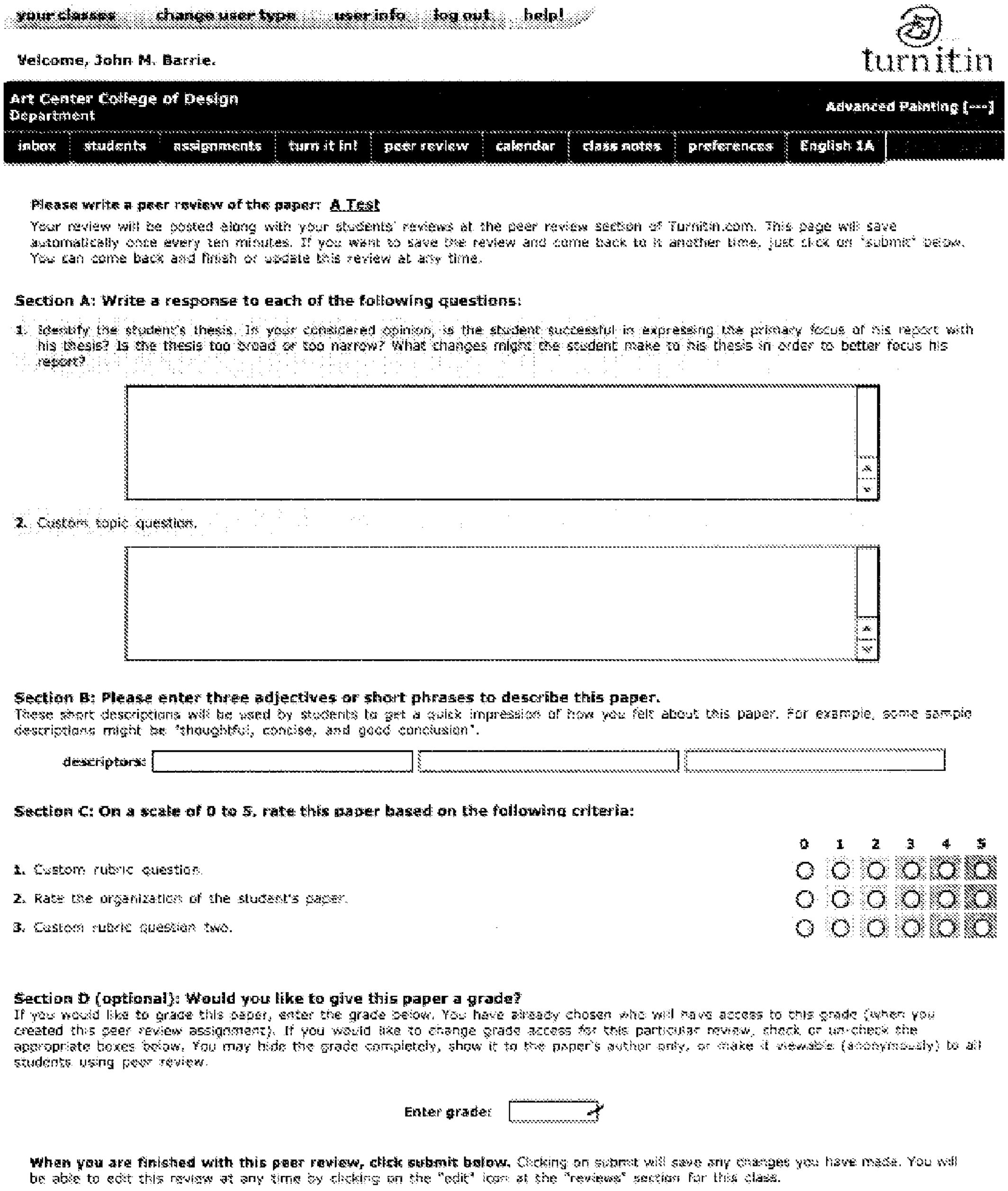
FIG. 19 shows a user interface screen provided in one embodiment of the peer review application of the present invention.

When the sponsor wishes to review a selected paper, the pencil icon in the "post review" column of the page shown in FIG. 18 is clicked on to access the page shown in FIG. 19. This page can provide questions and rubrics which are identical to those being used by the other reviewers, or it can be customized to provide other questions and rubrics. In addition, short adjectives or phrases, such as, for example, "thoughtful" "concise" "incomplete" "disorganized" etc. can be provided by the sponsor to describe his or her overall impression of the paper. This field could also, if desired, be provided to the other reviewers. An optional field is also preferably provided which enables the sponsor to enter a grade for the paper. Upon completion of the review, the sponsor selects the "submit" icon at the bottom of FIG. 19 to update and return to the screen shown in FIG. 18.

Figure 20:
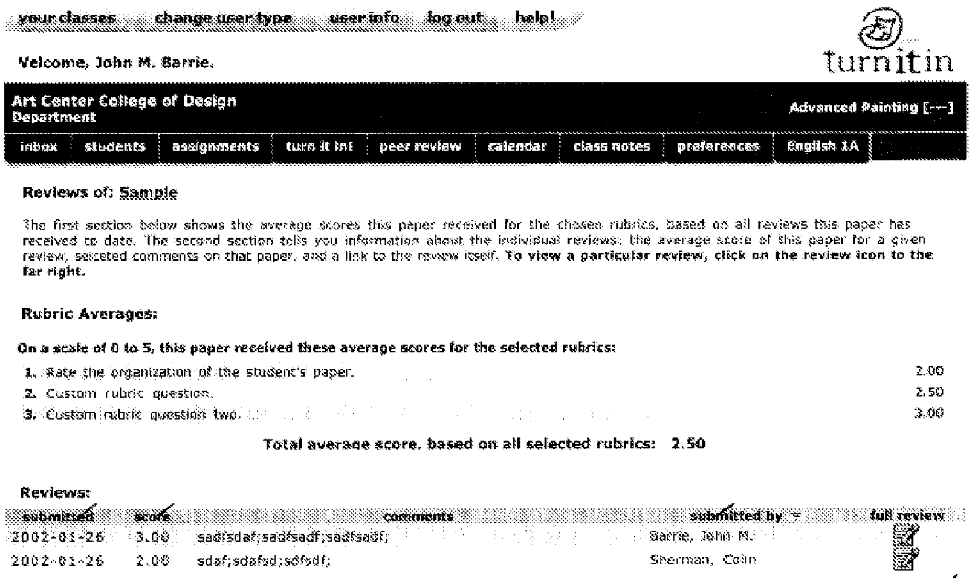
FIG. 20 shows a user interface screen provided in one embodiment of the peer review application of the present invention.
Figure 21:
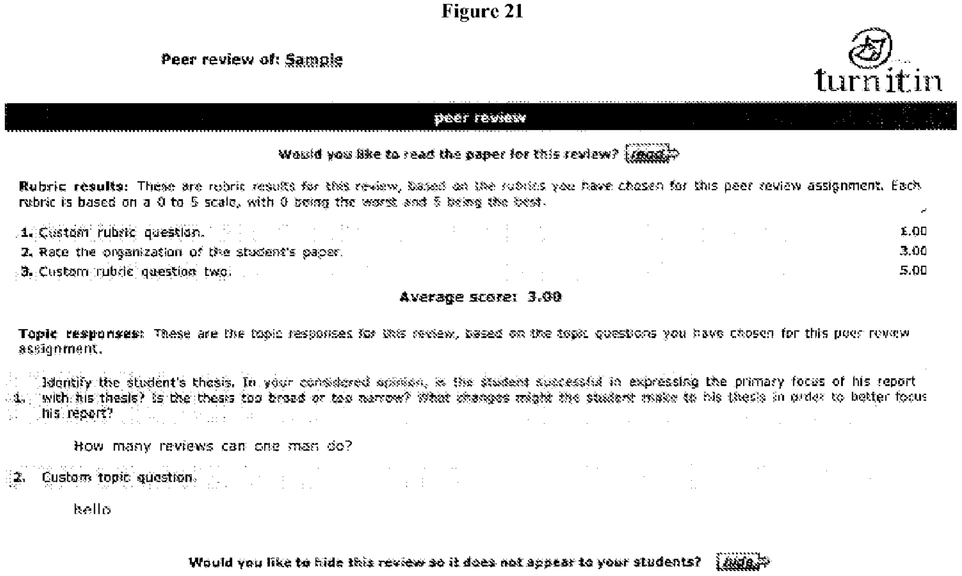
FIG. 21 shows a user interface screen provided in one embodiment of the peer review application of the present invention.

The sponsor can read the submitted reviews by clicking the icon in the "read" column of FIG. 18. This accesses a peer review page (FIG. 20) which shows relevant summary information relating to all reviews such as, for example, the average score by rubric, reviews which have been posted, the individual score by each reviewer, comments by each reviewer, the identity of each reviewer, and a link to the full text of each review showing the responses to the topical questions and rubrics (FIG. 21). The full text of each review, shown in FIG. 21, also preferably provides a link (shown at the top of the page) to enable the sponsor to read the paper, as well as the option of hiding the review, if desired, so that it is not disclosed to the students.

Figure 22:
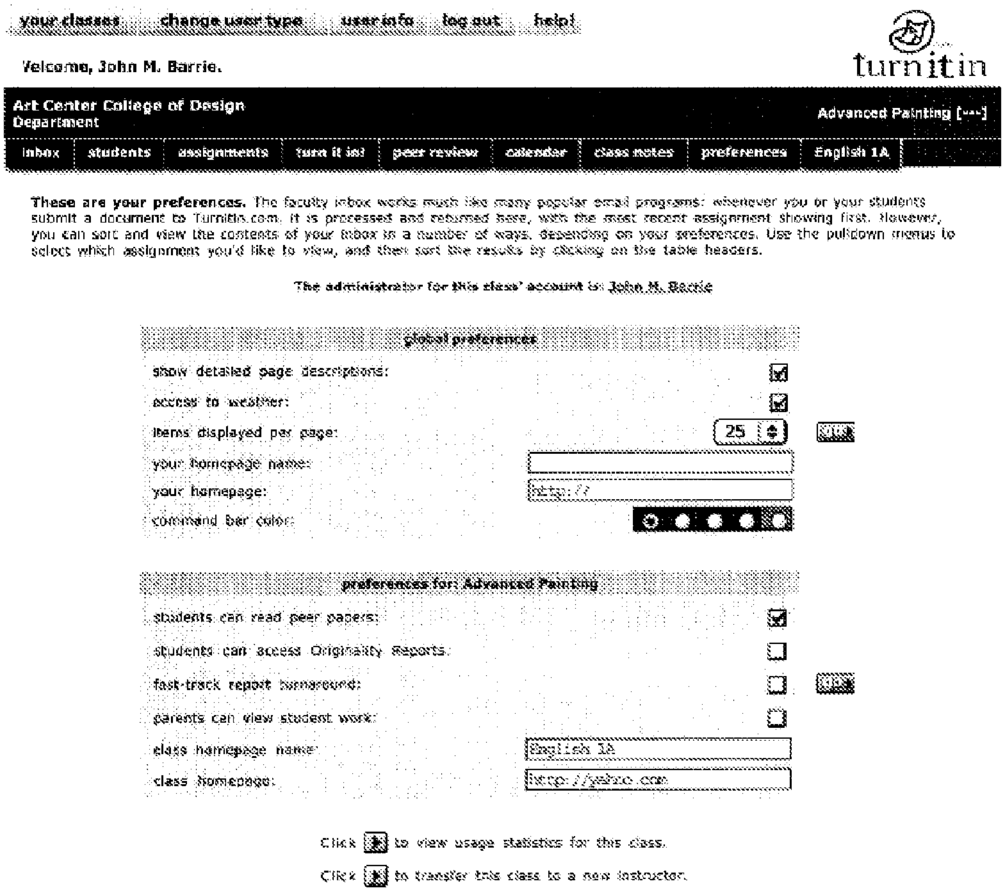
FIG. 22 shows a user interface screen provided in one embodiment of the peer review application of the present invention.

The system also preferably allows sponsors to establish their preferences by selecting the account navigation bar icon marked "preferences." This provides access to the screen shown in FIG. 22, which preferably allows global preferences for the user interface, such as, for example, the color of the command bar, the homepage name and address of the sponsor, the number of items to be displayed on a page, whether detailed page descriptions should be shown, etc., to be selected or changed. Additionally, preferences for each class or project can also be provided, such as, for example, the name and address for each class homepage, others who can view the work of submitters, what documents will be accessible to the submitters, etc.

Finally, a "help!" icon is preferably provided on the system navigation bar which provides information to help the user navigate the system. An example of a typical "help!" screen is shown at FIGS. 23*a* and 23*b*. Pop up help screens are also used throughout the system where appropriate. For example, the first time a sponsor wishes to create a peer review assignment, a screen can pop up to ask the sponsor if he or she wishes to review the tutorial.

Use of the System by Submitters

Figure 24B:
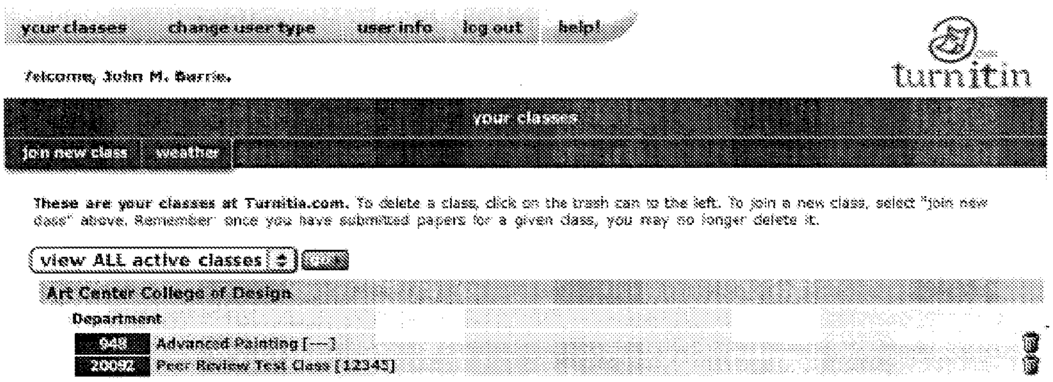
FIG. 24 shows a user interface screen provided in one embodiment of the peer review application of the present invention.
Figure 25:
FIG. 25 shows a user interface screen provided in one embodiment of the peer review application of the present invention.

As shown in FIGS. 1, 2*b* and 24, a submitter, such as, for example, a student, accesses the user interface and logs in to the system to call up the submitter's homepage. The submitter's homepage will list all classes, projects or accounts being tracked for the submitter. In the embodiment shown in FIG. 24, the submitter is a student enrolled in two classes. Optionally, by selecting the "join new class" icon on the Account Navigation Bar, the submitter can add new classes to the home page and track all classes for which he enrolls or all projects in which he is a participant. By selecting a particular class (e.g., by clicking on the name of the class), the submitter can access their Class (or Project) portfolio. The portfolio, shown in FIG. 25, contains a list of all assignments submitted during the class. The class portfolio, and all other pages in the class account, contains a Class Account Navigation Bar across the top which provides icons for navigating the system, including "class portfolio," "assignments," "turn it in!," "peer review," "calendar," "class notes," and "preferences." The class portfolio preferably includes information regarding the type of assignment (paper, review, test, etc.), the date the work was submitted, the title of the work, and whether any reviews of papers have been posted. If reviews authorized for release to the submitter have been posted in the "reviews" column, the submitter can click on the icon "read" to call up the reviews. A link may also be provided to enable the submitter to send a message (for example, via email) to the sponsor.

Figure 26:
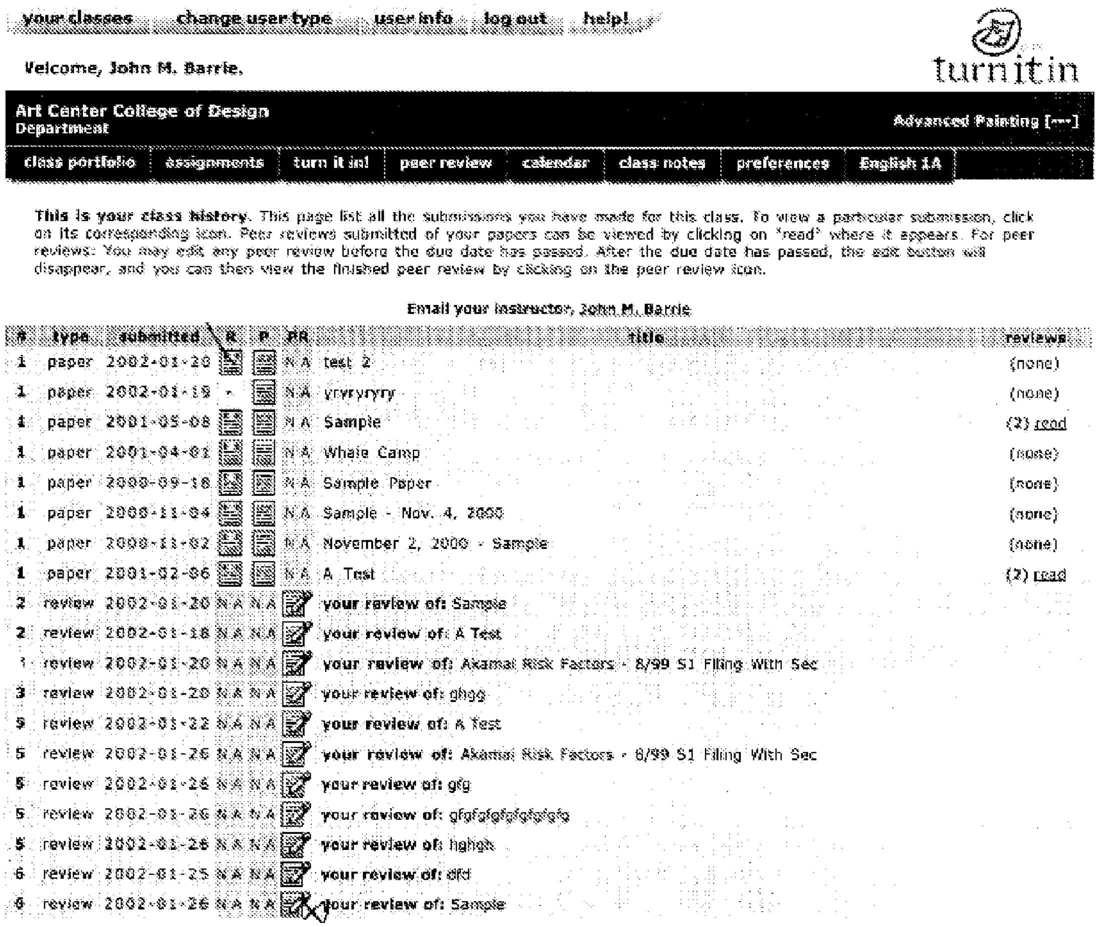
FIG. 26 shows a user interface screen provided in one embodiment of the peer review application of the present invention.

As shown in FIG. 26, if the sponsor allows the submitters to review the originality reports generated for papers, a link will be displayed under column "R" in the Class Portfolio. Clicking on an originality report icon will display the corresponding originality report, such as that shown in FIG. 7.

Figure 27:
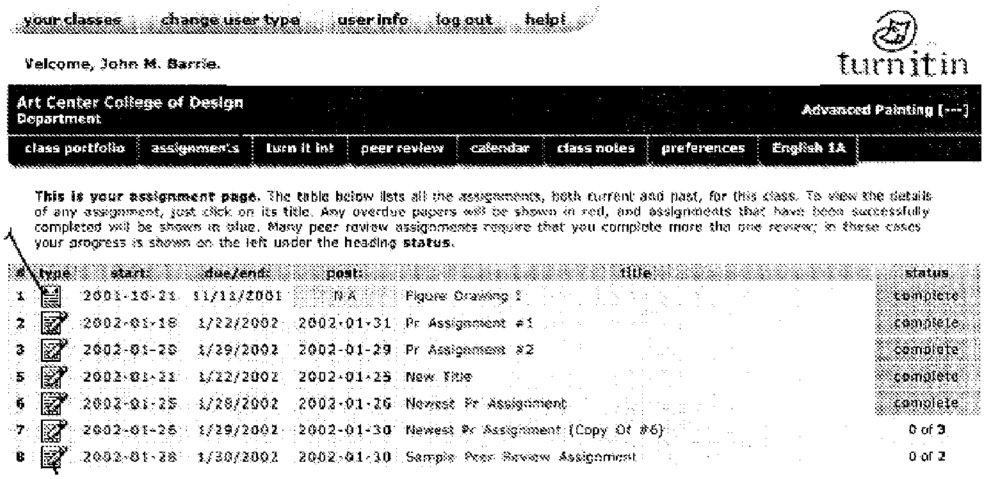
FIG. 27 shows a user interface screen provided in one embodiment of the peer review application of the present invention.

The submitter can review upcoming assignments by selecting the "assignments" icon from the class account navigation bar. The assignments page, shown in FIG. 27, preferably displays the type of assignment (paper, peer review, etc.), the start date, the due or end date, the date when results (such as grades, reviews, etc. will be posted), the title of the assignment, and the current status. Every time the submitter completes an assignment by uploading to the system, this page will be updated to show the status of the assignment as "complete." For partial submissions (for example, where a number of papers are to be reviewed), the status column will be updated to show the number completed.

Figure 28:
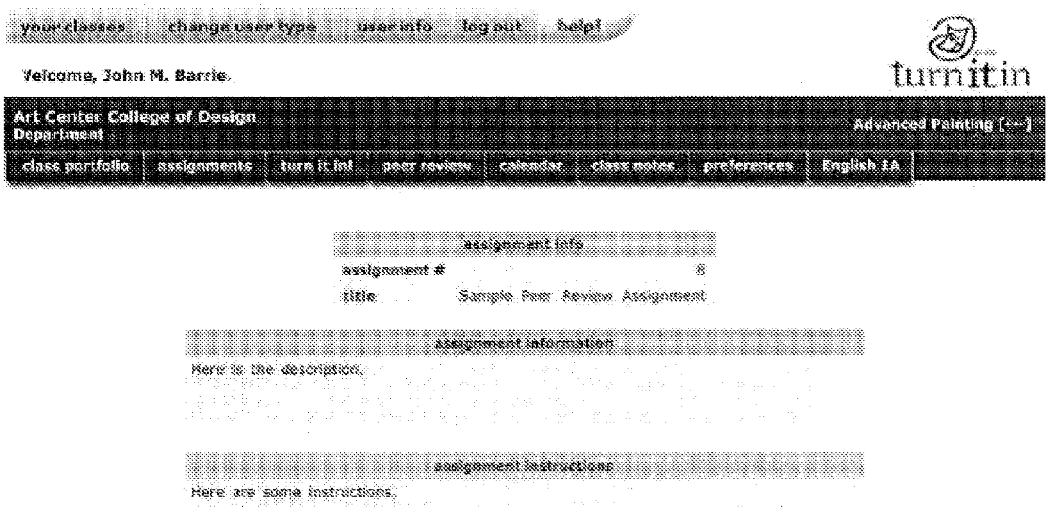
FIG. 28 shows a user interface screen provided in one embodiment of the peer review application of the present invention.

To determine the parameters and criteria for any assignment, the submitter clicks on an assignment title to go to a page, such as that shown in FIG. 28, containing the detailed instructions for completing that assignment.

Figure 29:
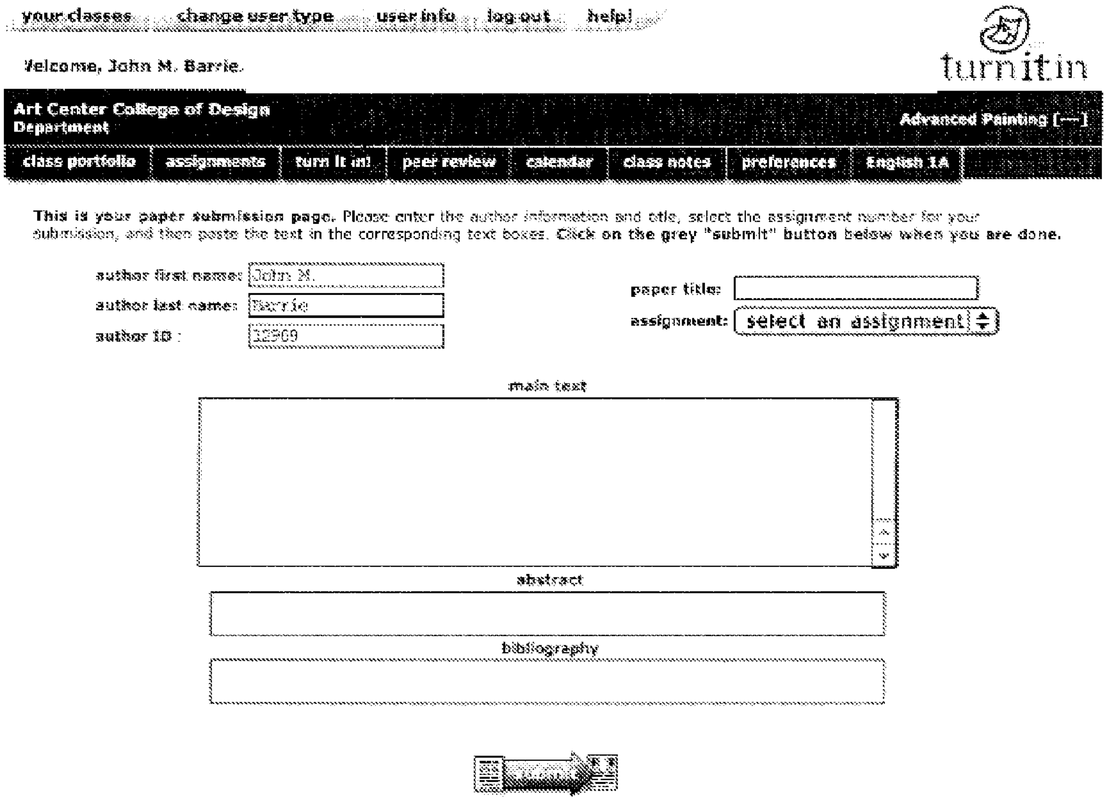
FIG. 29 shows a user interface screen provided in one embodiment of the peer review application of the present invention.

To submit a paper, the submitter selects the "Turn it in!" icon on the class account navigation bar to access the paper submission page shown in FIG. 29. This page allows the submitter to provide the paper title and the author's first and last name and ID, and select the assignment for which the paper is being submitted. The text of the paper, abstract, and bibliography is preferably "cut and pasted" into the places provided on this page. By using the "cut and paste" method it is possible to avoid problems typically encountered with attempting to upload papers saved in different formats. However, alternatively, it should be possible to save the paper in a specified format (such as, for example, Microsoft® Word, WordPerfect®, Rich Text Format) and provide a link for uploading the file to the system. Once the information has been provided, the submitter selects the "submit" icon at the bottom of the page to upload the paper to the system.

Figure 17:
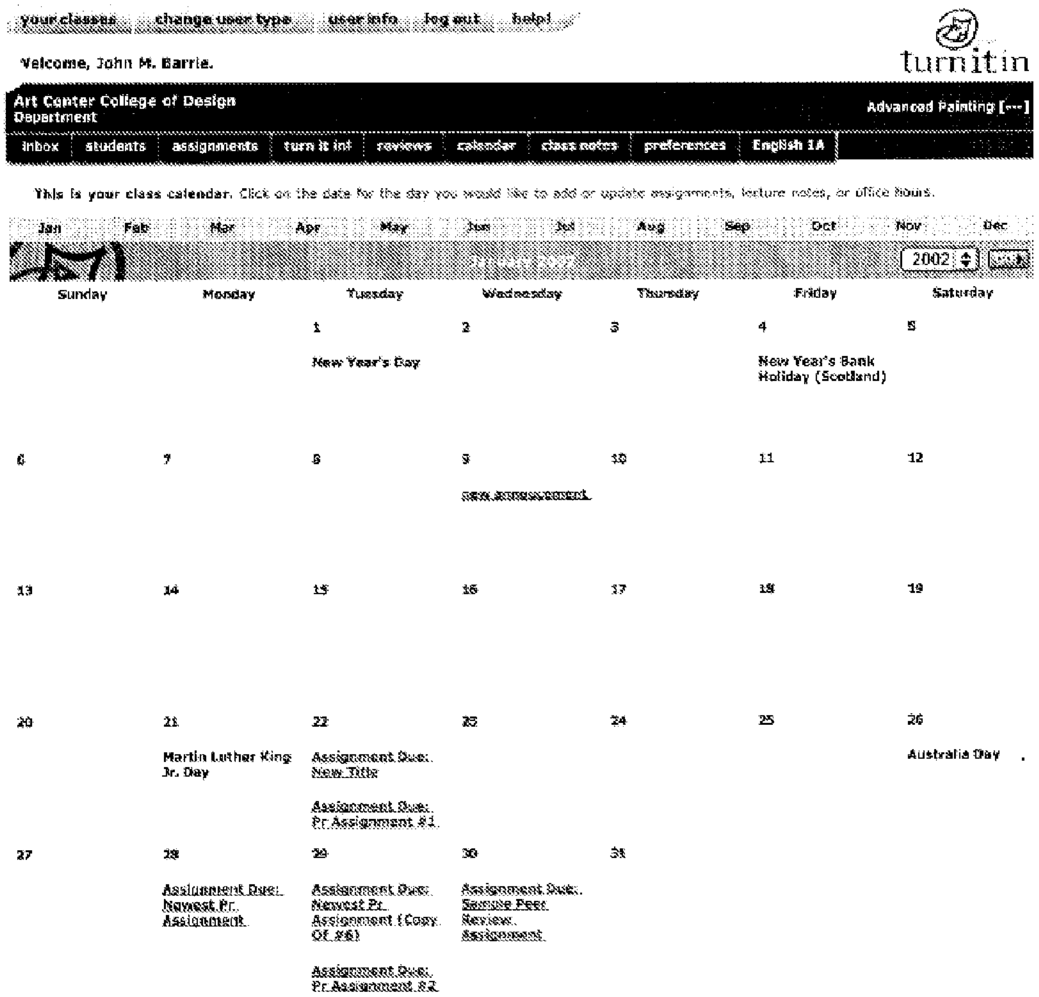
FIG. 17 shows a user interface screen provided in one embodiment of the peer review application of the present invention.

To access the central class calendar, the submitter selects the "calendar" icon on the class account navigation bar to access the calendar as shown in FIG. 17. Assignments can be accessed from this page by clicking on any assignment shown on the calendar.

Any posted class notes can be accessed by selecting the "class notes" icon on the class account navigation bar. The submitter's preferences can be set or modified by selecting the "preferences" icon on the class account navigation bar.

Use of the System by Reviewers

Figure 31:
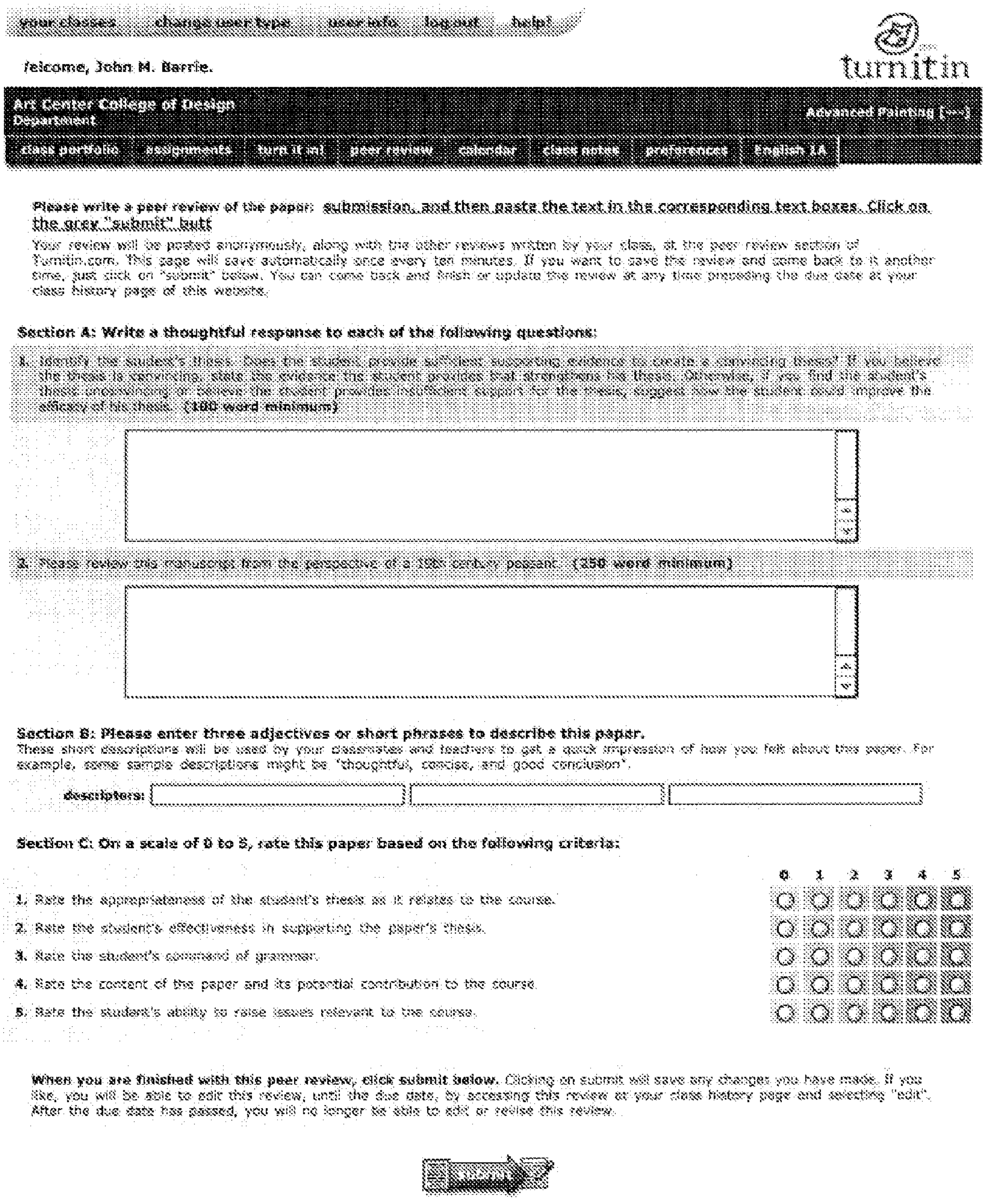
FIG. 31 shows a user interface screen provided in one embodiment of the peer review application of the present invention.
Figure 32:
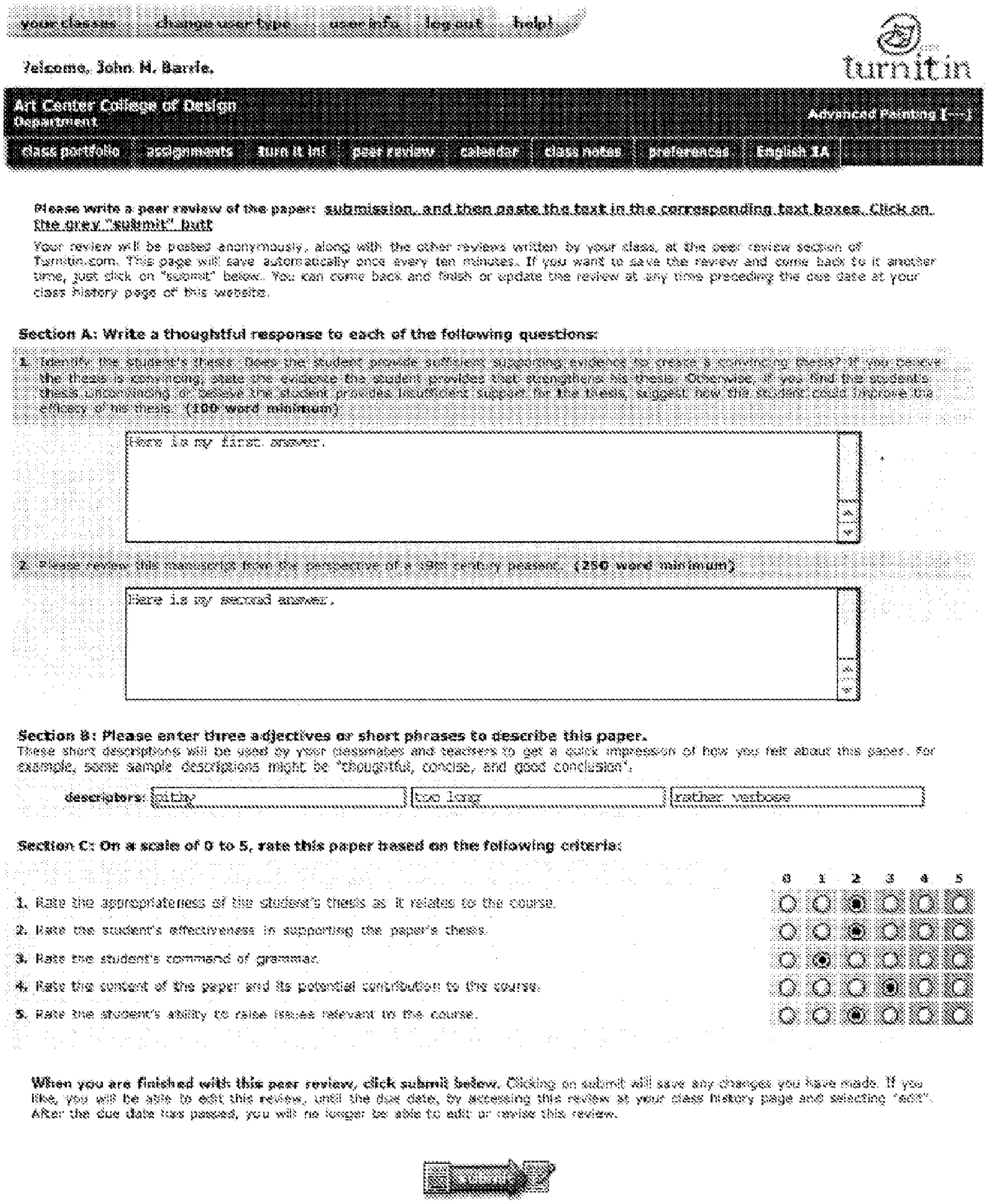
FIG. 32 shows a user interface screen provided in one embodiment of the peer review application of the present invention.

In an academic setting, the submitters/students may also be the reviewers. In that event, the peer review function is included with the student's class account as shown in FIG. 2B. To submit a peer review, the student either clicks on the title of the peer review assignment of the page shown in FIG. 27, or selects the "peer review" icon on the class account navigation bar to access the peer review page shown in FIG. 30. This page provides information regarding when the review is due, including date and time, and when the reviews will be posted. A list of all class papers is provided, and a review icon (in this case, a pencil) is displayed next to the papers to be reviewed. By clicking on the review icon, the page shown in FIG. 31 is displayed. The student may choose to examine the topical questions and rubrics contained in FIG. 31 first, and then go back to access and review the paper after ascertaining the standards for review. Once the paper has been examined, the student/reviewer can return to the peer review page, respond to the topical questions and rubrics, as shown in FIG. 32, and complete the peer review assignment by selecting the "submit" icon at the bottom of the page shown in FIG. 32. The reviewer can also mark up the paper on-line, with the changes being highlighted using any conventional method such as, for example, red-lining.

Figure 33:
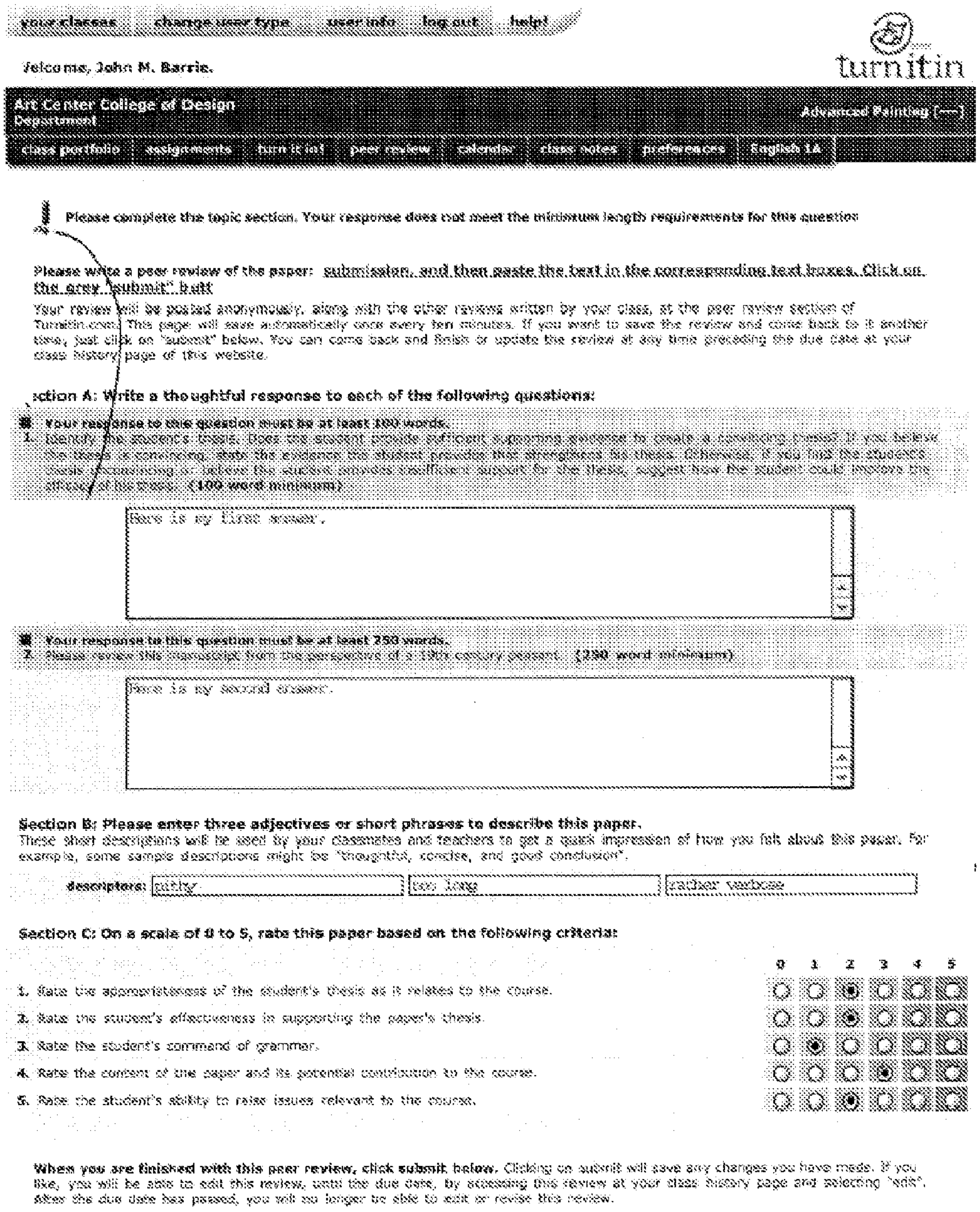
FIG. 33 shows a user interface screen provided in one embodiment of the peer review application of the present invention.

In the event the student's/reviewer's response does not meet the criteria set by the sponsor (for example, the minimum length of a response to a topical question is not met), an error message can be generated and/or the submission not accepted until correction is made. An example of such an error message is shown in FIG. 33 just below the class account navigation bar. A similar error message could be generated if there are other faults such as, for example, the student's failure to rate the paper using one of the rubrics in Section C.

Figure 30:
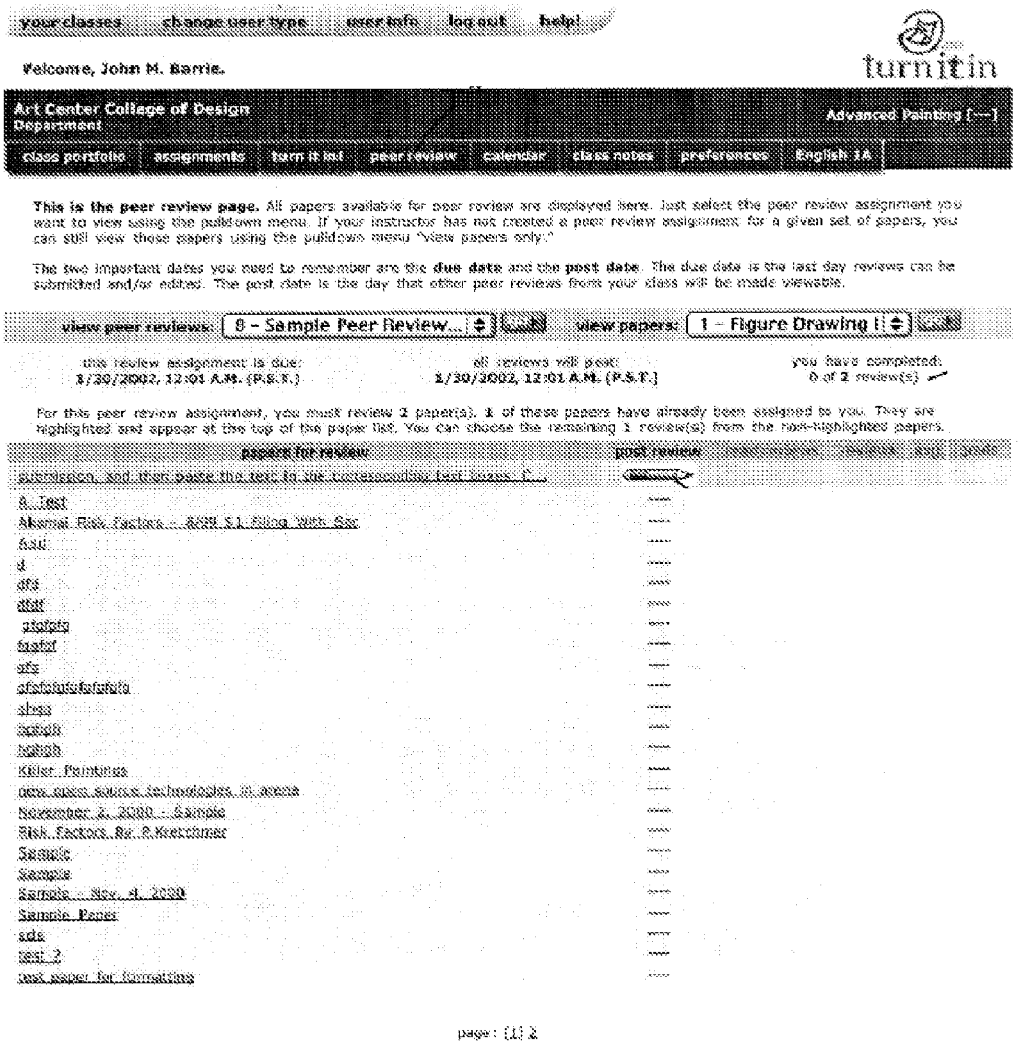
FIG. 30 shows a user interface screen provided in one embodiment of the peer review application of the present invention.
Figure 34:
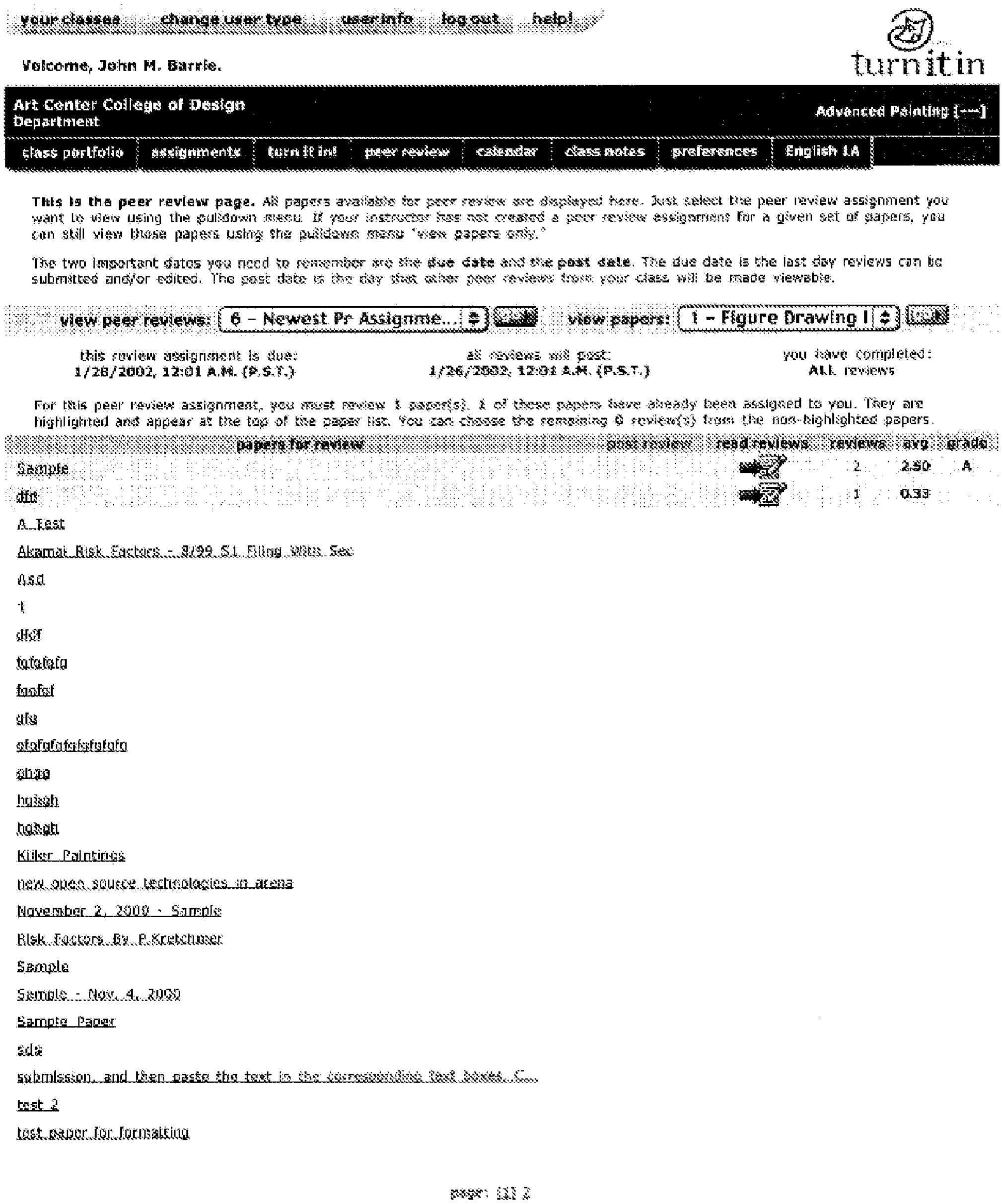
FIG. 34 shows a user interface screen provided in one embodiment of the peer review application of the present invention.
Figure 35:
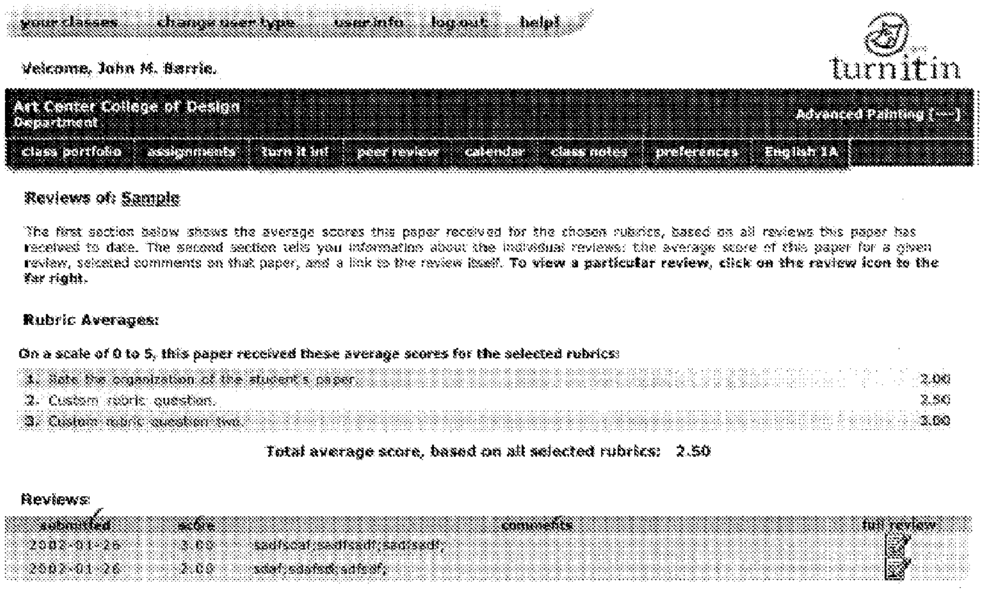
FIG. 35 shows a user interface screen provided in one embodiment of the peer review application of the present invention.
Figure 36:
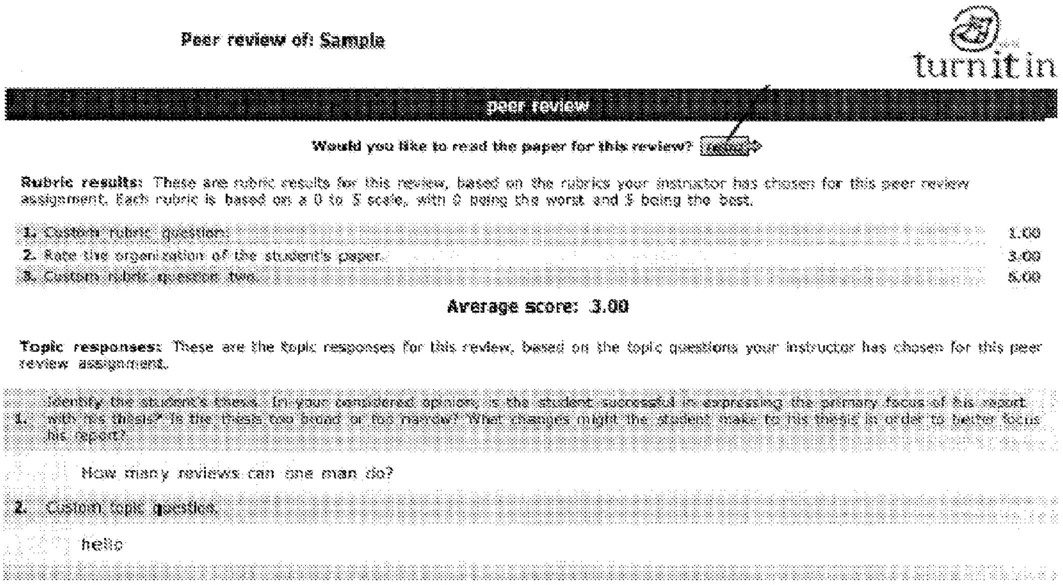
FIG. 36 shows a user interface screen provided in one embodiment of the peer review application of the present invention.

As shown in FIG. 34, if the student returns to the peer review page after the due date, the ability to review the assigned papers is preferably removed (for example by eliminating the icon in the "post review" column—compare FIG. 34 with FIG. 30). If the student returns to the peer review page after the post date, and if the sponsor has elected to make such information available to students, information relating to the reviews will be displayed. This may include the number of reviews submitted for each paper, the actual reviews may be accessible by clicking an icon (under the title "read reviews"), marked-up copies of the papers may also be available along with the paper as originally written, and summary information may also be shown for each paper, such as, for example, the statistical graded average for the reviews, grades and the like. By clicking on the "read reviews" icon, students can access the page shown in FIG. 35. This page shows the average scores for the selected rubrics, and a summary for each individual review, showing the date submitted, the score, the "comments" (entered as adjectives or short phrases in Section B of the review shown in FIG. 33), and an icon for accessing the full review. By clicking on the "full review" icon, the student accesses the page shown at FIG. 36 which shows the full responses to the topical questions and rubrics which form the basis for the review. In addition, a link to the paper reviewed can be provided to allow the person reading the review to go to the paper.

In situations where the reviewer is not also a submitter, a reviewer home page can be created, such as that shown in FIG. 2C, which can be accessed and navigated in substantially the same way as the other user pages described above (e.g., by logging on and providing identification information). A list of projects could be provided on the reviewer home page which lead to a project page including any peer review assignments for specific projects. For example, a reviewer may be a scientist responsible for reviewing papers for publication in a journal and also reviewing grant applications. These could be considered as two distinct projects which would appear on the reviewer home page.

If the reviewer selects one account page, such as, for example, a journal account page, the navigation bar might include links to a central calendar providing publication deadlines for specific issues which drive the dates for reviewing papers to be published in those issues, as well as a portfolio showing reviews already submitted. As described above, the navigation bar could include a "peer review" icon which will lead to a peer review page identifying papers submitted for publication and indicating those papers to be reviewed by the reviewer. Once reviews are completed and submitted to the sponsor inbox, the portfolio and peer review page can be updated to show the completed action. Once the post date is passed, the reviewer can also review the peer reviews submitted by other reviewers for the same or other papers. A peer review for articles submitted for publication could well contain additional information, including a recommendation on whether or not to publish the article, and whether or not the author needs specific revisions to the work before publication should occur.

If the reviewer selects a different account page, such as, for example, a grant program account, the navigation bar might include links to a central calendar providing, for example, dates for submitting materials for grants, dates for reviewing grant submissions, and dates for announcing the award of grants, etc. As described above, the account navigation bar could include a "peer review" icon which will lead to a peer review page identifying grant applications submitted for consideration, and icons which indicate which grant applications should be reviewed by the reviewer. As noted above, a sponsor will establish the topical questions and rubrics to be followed in evaluating the grant applications. In addition, the peer review page will likely also include a recommendation on whether or not the proposed work should be funded and/or the extent to which funding should be made.

Regardless of the situation under which the review occurs, the identity of the reviewers, while known to the sponsor, is most preferably not disclosed to the submitters or other reviewers, since reviewer anonymity in peer review situations promotes candid, honest reviews. However, to provide maximum flexibility, the system can be provided with the option of disclosing the reviewer's or submitter's identities. Moreover, the system can be set up to provide for more than one round of reviews.

Use of the System By Other Users

Figure 37:
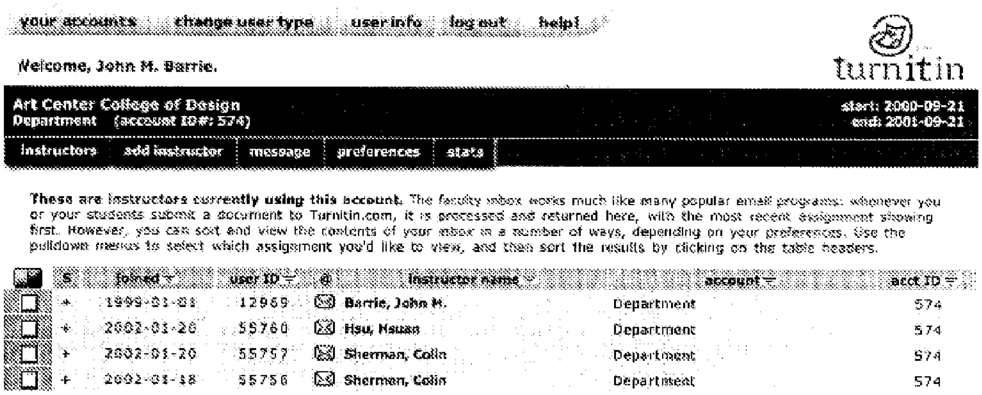
FIG. 37 shows a user interface screen provided in one embodiment of the peer review application of the present invention.
Figure 38:
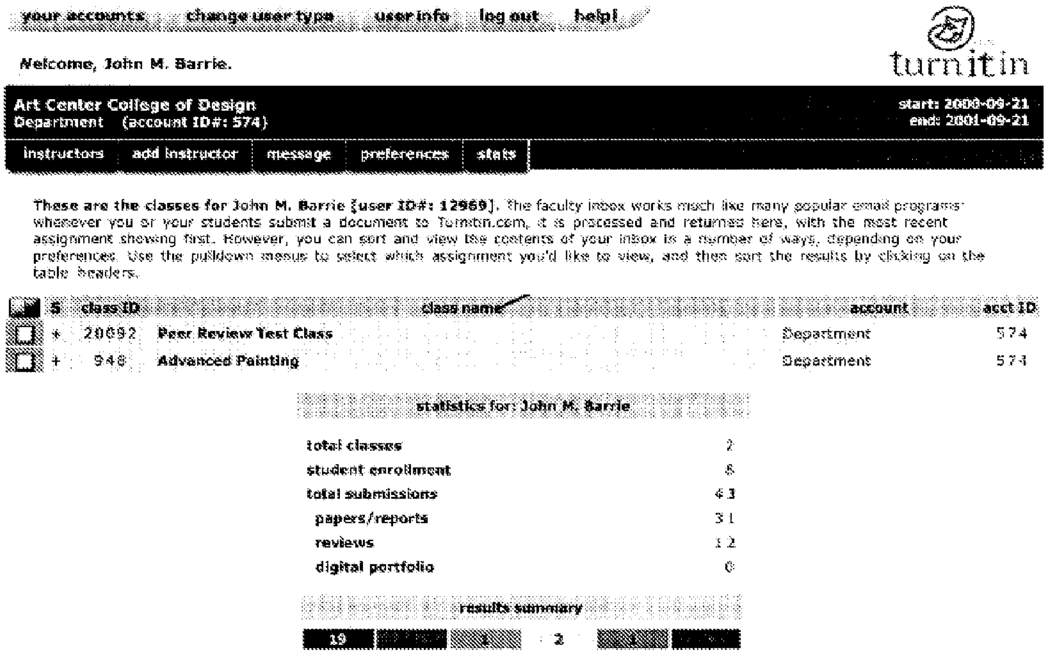
FIG. 38 shows a user interface screen provided in one embodiment of the peer review application of the present invention.

Users other than sponsors, submitters and reviewers may have access to the user interface. For example, an institution having more than one sponsor (such as a college with many professors, a journal with many reviewers and the like) may wish to appoint an account administrator, who can sign in and access the system as an Account Administrator. FIG. 37 shows a typical Account Administrator home page which can provide information for each authorized sponsor/professor such as, for example, the user ID and name of each sponsor authorized to access the system using the institution's account. The Account Navigation Bar includes icons which enable the Account Administrator to add new sponsors/professors, to edit entries for existing sponsors/professors, to deactivate professors (for example, by checking the blank box to the left of the entry for that sponsor/professor). Deactivation by the Account Administrator will deactivate all classes for that sponsor/faculty member, and block further access by other users to class records for that sponsor/faculty member. By clicking on the name of the sponsor/faculty member, the Account Administrator can review the Class Statistics page for that sponsor/faculty member as shown in FIG. 38.

Figure 39:
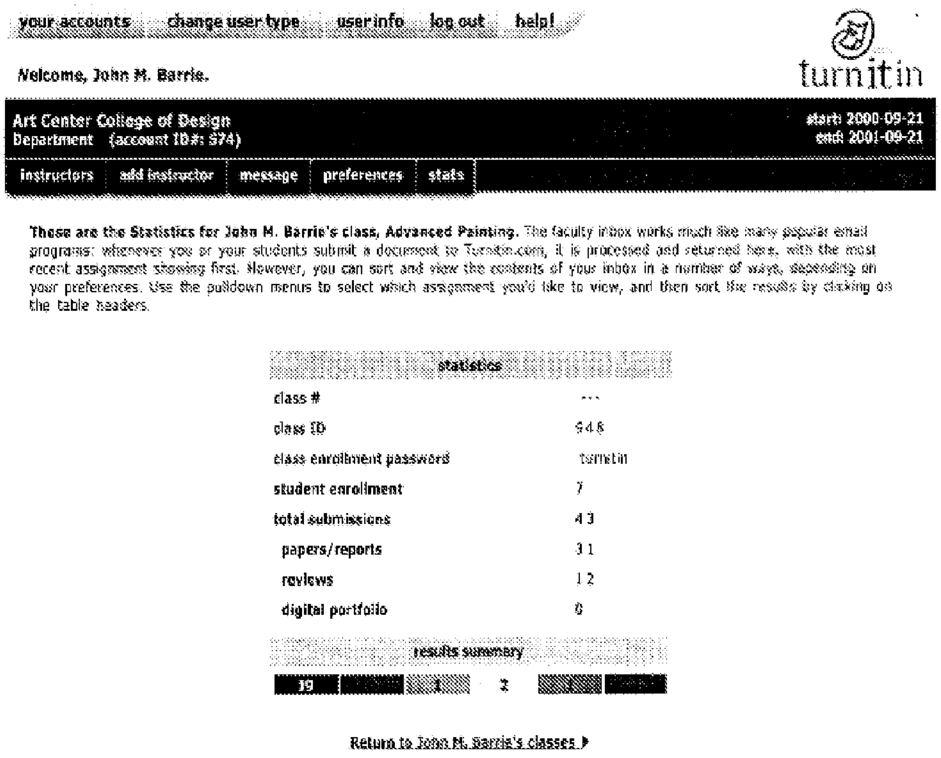
FIG. 39 shows a user interface screen provided in one embodiment of the peer review application of the present invention.

The Class Statistics page for each sponsor/faculty member can include a list of each class enrolled in the system, along with the class ID for each. In addition, selected statistics for that sponsor/faculty member may also be provided, such as, for example, the total number of classes, number of students in those classes, total number of submissions, including total number of papers or reports, peer reviews, and digital portfolios. The page shown at FIG. 38 may also include a function which enables the Account Administrator to deactivate any one or more of the classes/accounts shown. For example, if an account is created for a class in advance of the start of a semester, and the class is subsequently cancelled due to low enrollment, the Account Administrator can deactivate the account established for that class by, for example, by clicking the box to the left of the class name. To examine the statistics for each listed class, the Account Administrator can click on the class name to access the page shown at FIG. 39.

Figure 40:
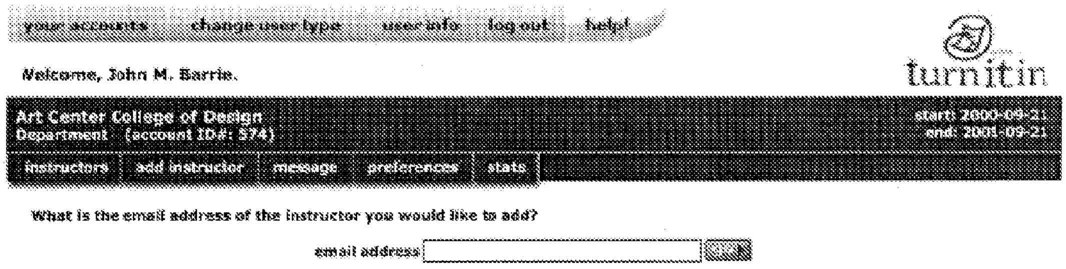
FIG. 40 shows a user interface screen provided in one embodiment of the peer review application of the present invention.

Account administrators can add sponsors within their institution by providing each sponsor with the necessary account enrollment information, or they can manually add the sponsor, for example by clicking on the "add instructor" icon shown in FIG. 37 and providing the sponsor's email address after accessing the screen shown in FIG. 40.

Figure 41:
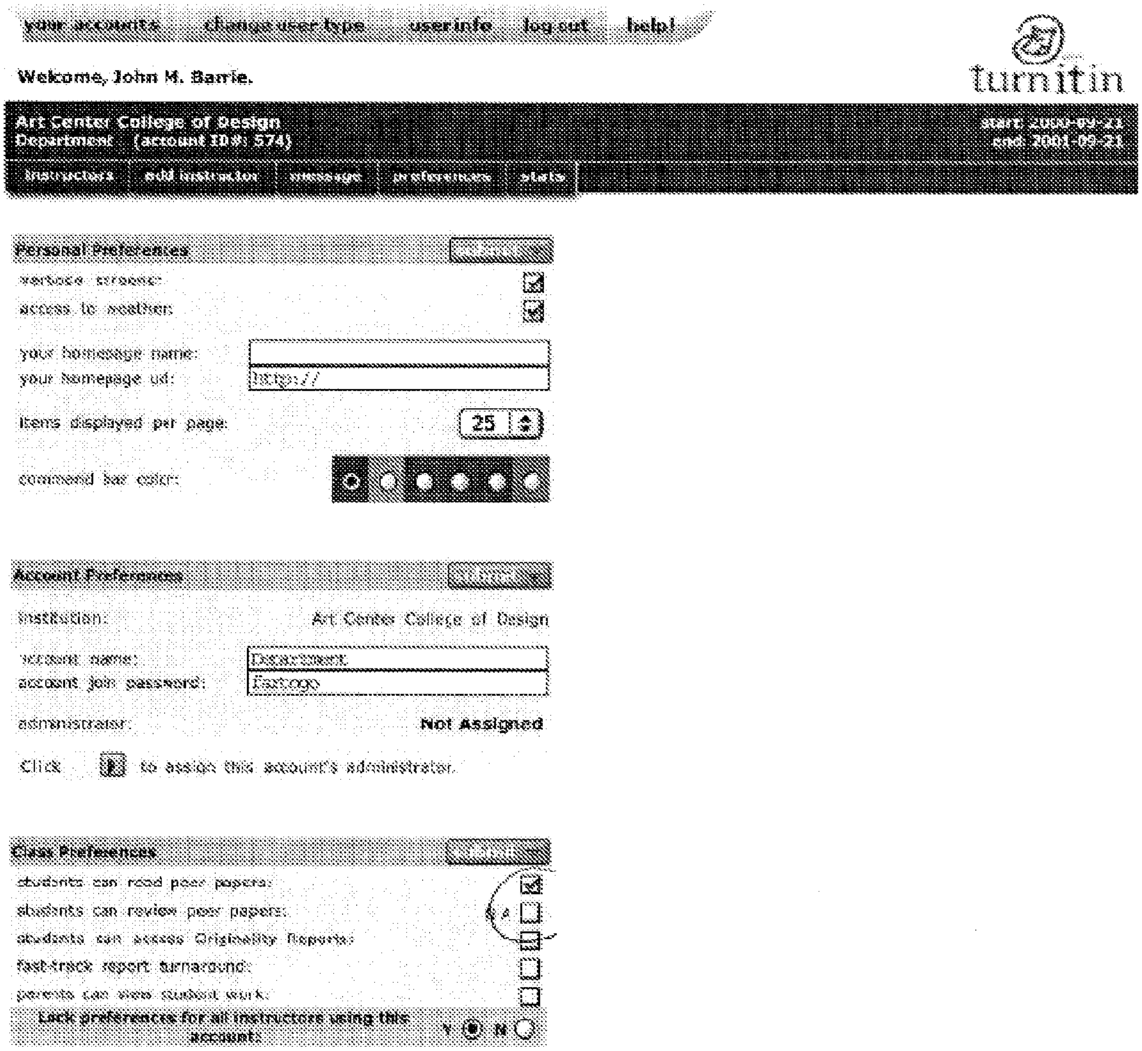
FIG. 41 shows a user interface screen provided in one embodiment of the peer review application of the present invention.

Account administrators can also manage the preferences for their user profile and for their institutions account by selecting the "preferences" icon on the Account Navigation Bar and entering the information relating to preference selections on a screen like that shown at FIG. 41.

Yet other users may be authorized to access the system. For example, parents may be given access to their student's class calendars, assignment pages, and class portfolios. Visitors, such as other institutions, may be authorized to access the system on a free trial basis in order to evaluate the system for use at their institution. Such trial use would not permit such visitors to access accounts established by authorized users, but would permit the visitors to create a trial account, create assignments, submit papers, create and submit peer reviews, and perform all functions on a trial basis to verify the suitability of the system for use.

The present invention is not limited by the nature of the user. The user may be an individual, institution or any other entity. Any user involved in peer review activities may find beneficial use for the integrated system, software and methods of the present invention. The description provided above illustrates some uses of the systems and methods of the present invention, and are specifically directed to the preferred embodiments of the invention, and are not meant to limit the scope of the present invention. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the relevant fields are intended to be within the scope of the following claims.

We claim:

1. A system for originality checking of papers, comprising; 1) a user interface for identifying the user, for accepting predefined user information, for uploading papers, and for providing a result; 2) an originality checking application operably linked to said user interface, said originality checking application comprising knowledge base information and defined rules for checking uploaded papers for plagiarism; wherein said originality checking application includes rules for checking for plagiarism including; a) obtaining, fingerprinting, and storing on a database academic papers from a variety of sources which might be copied, said sources comprising documents stored in a database and documents gathered from the internet, b) fingerprinting uploaded papers to be checked for originality, c) checking said uploaded papers for originality by comparing said fingerprints of said uploaded papers to fingerprints of said academic papers to identify possible matches between said fingerprinted uploaded papers and said fingerprinted academic papers, d) comparing said uploaded paper's full text to a full text of all said possible matches wherein said possible matches are identified by said comparison of said fingerprints of said uploaded papers to said fingerprint of said academic papers, and e) generating an originality report which highlights those portions of said uploaded paper which match portions of said academic papers identified as possible matches by said comparison of said uploaded paper's fill text to said fill text of said possible matches; wherein said originality report further comprises a report of the level of duplication between said paper's full text and said full text of said possible matches wherein said report provides an overall similarity index ranking, and wherein said similarity index ranking and said portions on said academic papers identified as possible matches are both displayed together on said originality report on said user interface; and, 3) a computer system having stored therein said originality checking application, wherein said computer system comprises computer memory and a computer processor.

2. The system of claim 1 additionally comprising an intermediary service provider operably linked to said computer system, wherein said intermediary service provider is capable of displaying said user interface to all users who are in communication with said user interface.

3. The system of claim 1 wherein said predefined user information is used to categorize users as one or more of the group consisting of submitters, sponsors, administrators, and visitors.

4. The system of claim 3 wherein when said user is identified as a sponsor, said predefined user information comprises information needed to create an assignment to generate submission of a paper.

5. The system of claim 1 wherein said knowledge base information comprises a list of potential submitters, a list of potential sponsors, at least one paper to be checked for originality and completed originality reports.

6. The system of claim 2, wherein said intermediary service provider is a hosted electronic environment.

7. The system of claim 6, wherein said hosted electronic environment is a website accessible on the internet.

8. The system of claim 1 wherein said user information includes identification data used to verify the user as a subscriber.

9. The system of claim 1 wherein said user is remote from said computer system and accesses said user interface using a remote computing device in communication with said computer system and capable of using said user interface.

10. The system of claim 1 additionally comprising a calendaring application stored on said computer system, said calendaring application operably linked to said user interface and comprising knowledge base information and defined rules for (a) establishing and storing dates for completing assignments and (b) linking abbreviated calendar entries to full-text assignment requirements.

11. The system of claim 1 additionally comprising an inbox application stored on said computer system, said inbox application operably linked to said user interface and comprising knowledge base information and defined rules for creating an inbox for each user.

* * * * *

UNITED STATES PATENT AND TRADEMARK OFFICE

CERTIFICATE OF CORRECTION

PATENT NO. : 8,296,661 B2
APPLICATION NO. : 12/558789
DATED : October 23, 2012
INVENTOR(S) : John M. Barrie and Colin C. Sherman It is certified that error appears in the above-identified patent and that said Letters Patent is hereby corrected as shown below:

Column 19, Line 21
CLAIM 1 "...said uploaded paper's fill text to said fill text of said possible ..."

SHOULD READ:

CLAIM 1: -- said uploaded paper's full text to said full text of said possible --

Signed and Sealed this
Twelfth Day of February, 2013

Teresa Stanek Rea
*Acting Director of the United States Patent and Trademark Office*